US012298710B2

(12) United States Patent
Izumiya et al.

(10) Patent No.: US 12,298,710 B2
(45) Date of Patent: May 13, 2025

(54) TONER FOR DEVELOPING ELECTROSTATIC CHARGE IMAGE

(71) Applicant: KAO CORPORATION, Tokyo (JP)

(72) Inventors: Yuta Izumiya, Wakayama (JP); Shogo Nomoto, Wakayama (JP)

(73) Assignee: KAO CORPORATION, Tokyo (JP)

( * ) Notice: Subject to any disclaimer, the term of this patent is extended or adjusted under 35 U.S.C. 154(b) by 568 days.

(21) Appl. No.: 17/641,771

(22) PCT Filed: Sep. 11, 2020

(86) PCT No.: PCT/JP2020/034447
§ 371 (c)(1),
(2) Date: Mar. 9, 2022

(87) PCT Pub. No.: WO2021/049607
PCT Pub. Date: Mar. 18, 2021

(65) Prior Publication Data

US 2022/0413408 A1 Dec. 29, 2022

(30) Foreign Application Priority Data

Sep. 13, 2019 (JP) ................................ 2019-167618

(51) Int. Cl.
*G03G 9/087* (2006.01)
*G03G 9/08* (2006.01)
*G03G 9/09* (2006.01)

(52) U.S. Cl.
CPC ......... *G03G 9/08755* (2013.01); *G03G 9/081* (2013.01); *G03G 9/08768* (2013.01); *G03G 9/08782* (2013.01); *G03G 9/0906* (2013.01)

(58) Field of Classification Search
CPC ............... G03G 9/08755; G03G 9/081; G03G 9/08768; G03G 9/08782; G03G 9/0906; G03G 9/08766
See application file for complete search history.

(56) References Cited

U.S. PATENT DOCUMENTS 5,447,814 A 9/1995 Nakadera et al.
5,529,876 A 6/1996 Sasaki et al.
5,763,130 A 6/1998 Sasaki et al.
2008/0286678 A1* 11/2008 Aoki .................. G03G 9/09321 430/109.3
2009/0232542 A1 9/2009 Yamamoto et al.
2014/0370428 A1* 12/2014 Wang ................... G03G 9/0804 430/137.14
2015/0253686 A1 9/2015 Miyakoshi et al.
2018/0004105 A1 1/2018 Murata et al.
2020/0363741 A1 11/2020 Murata et al.

FOREIGN PATENT DOCUMENTS

JP 6-266149 A 9/1994
JP 2000-330331 A 11/2000
JP 2006-350035 A 12/2006
JP 2015-7765 A 1/2015
JP 2016-136249 A 7/2016
JP 2018-59963 A 4/2018
JP 2019-35807 A 3/2019
JP 2019-95474 A 6/2019
JP 2019-152855 A 9/2019
WO WO 2019/156232 A1 8/2019

OTHER PUBLICATIONS

Extended European Search Report issued on Aug. 21, 2023 in European Patent Application No. 20863827.0, 6 pages.
International Search report issued Dec. 1, 2020 in PCT/JP2020/034447, filed on Sep. 11, 2020, 2 pages.

* cited by examiner

*Primary Examiner* — Stewart A Fraser

(74) *Attorney, Agent, or Firm* — Oblon, McClelland, Maier & Neustadt, L.L.P.

(57) ABSTRACT

The present invention relates to a toner for development of electrostatic images which contains a colorant, a resin composition (P) and a resin composition (W), in which the resin composition (P) is a resin composition formed by subjecting an acid group-containing amorphous polyester-based resin (A) and an amine compound to condensation reaction, and the resin composition (W) is a resin composition formed by subjecting an alcohol component (W-al), a carboxylic acid component (W-ac) and a hydrocarbon wax containing at least one functional group selected from the group consisting of a hydroxy group and a carboxy group to condensation reaction; and a process for producing the toner.

18 Claims, No Drawings

TONER FOR DEVELOPING ELECTROSTATIC CHARGE IMAGE

FIELD OF THE INVENTION

The present invention relates to a toner for development of electrostatic images which is used for developing latent images that are formed in electrophotography, electrostatic recording method, electrostatic printing method, etc., a process for producing the toner, and the like.

BACKGROUND OF THE INVENTION

In the field of electrophotography, with the progress of electrophotographic systems, it has been demanded to develop toners for electrophotography which are adaptable for high image quality and high copying or printing speed.

For example, JP 2015-7765A (Patent Literature 1) discloses a toner for development of electrostatic images containing a resin binder composition for toners which contains an amorphous composite resin containing a polyester resin portion and a vinyl-based resin portion, and a crystalline polyester, in which the composite resin contains a predetermined amount of a structural moiety derived from a hydroxy group-containing hydrocarbon wax whose melting point falls within a predetermined range, and the crystalline polyester is obtained from raw material monomers containing an aliphatic diol having 6 to 12 carbon atoms.

SUMMARY OF THE INVENTION

The present invention relates to the following aspects [1] and [2].

[1] A toner for development of electrostatic images, containing a colorant, a resin composition (P) and a resin composition (W), in which:

the resin composition (P) is a resin composition formed by subjecting an acid group-containing amorphous polyester-based resin (A) and an amine compound to condensation reaction; and the resin composition (W) is a resin composition formed by subjecting an alcohol component (W-al), a carboxylic acid component (W-ac) and a hydrocarbon wax containing at least one functional group selected from the group consisting of a hydroxy group and a carboxy group to condensation reaction.

[2] A process for producing a toner for development of electrostatic images, including:

Step 1: subjecting an acid group-containing amorphous polyester-based resin (A) and an amine compound to condensation reaction to obtain a resin composition (P); and Step 2: melt-kneading toner raw materials containing the resin composition (P) obtained in the step 1, a colorant and a resin composition (W), in which the resin composition (W) is a resin composition formed by subjecting an alcohol component (W-al), a carboxylic acid component (W-ac) and a hydrocarbon wax containing at least one functional group selected from the group consisting of a hydroxy group and a carboxy group to condensation reaction.

DETAILED DESCRIPTION OF THE INVENTION

In recent years, in order to realize low costs in printing using a toner, it has been demanded to reduce an amount of the toner deposited when used in the printing. If it is intended that the amount of the toner deposited is reduced, the concentration of a colorant used tends to be lowered, so that the density of images formed by the toner also tends to be lowered. Therefore, it has been required to increase an amount of the colorant used in the toner. However, it has been found that if the amount of the colorant used relative to a resin is increased, the colorant tends to be deteriorated in dispersibility in the resin, so that the resulting toner tends to fail to attain a sufficient image density as much as expected and also tends to be deteriorated in chroma of the images formed.

In the technologies of the Patent Literature 1, the colorant used in the toner tends to be still insufficient in dispersibility, and it has been therefore required that the toner is further improved in image density and chroma.

The present invention relates to a toner for development of electrostatic images which is excellent in image density and chroma, a process for producing the toner, and the like.

The present inventors have found that by incorporating a resin composition formed by subjecting an acid group-containing amorphous polyester-based resin and an amine compound to condensation reaction and a resin composition formed by subjecting an alcohol component, a carboxylic acid component and a hydrocarbon wax containing at least one functional group selected from the group consisting of a hydroxy group and a carboxy group to condensation reaction, into a toner, it is possible to provide such a toner for development of electrostatic images which is excellent in image density and chroma, a process for producing the toner, and the like.

That is, the present invention relates to the following embodiments [1] and [2].

[1] A toner for development of electrostatic images, containing a colorant, a resin composition (P) and a resin composition (W), in which:

the resin composition (P) is a resin composition formed by subjecting an acid group-containing amorphous polyester-based resin (A) and an amine compound to condensation reaction; and the resin composition (W) is a resin composition formed by subjecting an alcohol component (W-al), a carboxylic acid component (W-ac) and a hydrocarbon wax containing at least one functional group selected from the group consisting of a hydroxy group and a carboxy group to condensation reaction.

[2] A process for producing a toner for development of electrostatic images, including:

Step 1: subjecting an acid group-containing amorphous polyester-based resin (A) and an amine compound to condensation reaction to obtain a resin composition (P); and Step 2: melt-kneading toner raw materials containing the resin composition (P) obtained in the step 1, a colorant and a resin composition (W), in which the resin composition (W) is a resin composition formed by subjecting an alcohol component (W-al), a carboxylic acid component (W-ac) and a hydrocarbon wax containing at least one functional group selected from the group consisting of a hydroxy group and a carboxy group to condensation reaction.

In accordance with the present invention, it is possible to provide a toner for development of electrostatic images which is excellent in image density and chroma, a process for producing the toner, and the like.

[Toner for Development of Electrostatic Images]

The toner for development of electrostatic images according to the present invention (hereinafter also referred to merely as a "toner of the present invention") contains a colorant, a resin composition (P) and a resin composition (W).

The resin composition (P) is a resin composition formed by subjecting an acid group-containing amorphous polyester-based resin (A) (hereinafter also referred to merely as a "resin (A)") and an amine compound to condensation reaction.

The resin composition (W) is a resin composition formed by subjecting an alcohol component (W-al), a carboxylic acid component (W-ac) and a hydrocarbon wax containing at least one functional group selected from the group consisting of a hydroxy group and a carboxy group to condensation reaction.

The toner of the present invention is capable of exhibiting excellent image density and chroma.

The reason why the aforementioned advantageous effects can be attained by the present invention is considered as follows, though it is not clearly determined yet.

That is, the resin composition (P) contains a moiety derived from the amine compound in a structure thereof. Therefore, it is considered that the resin composition acts as a dispersant for the colorant to allow the colorant to be present in a finely dispersed state in the toner. Moreover, since the resin composition (W) contains a constitutional component derived from the hydrocarbon wax, it is considered that the colorant is improved in wettability to the resin composition (W) and therefore improved in dispersibility therein. As a result, it is considered that the resulting toner can be improved in image density and chroma.

The definitions of various terms used in the present specification, etc., are described below.

The crystallinity of the resin is indicated by a crystallinity index thereof which is defined by a ratio of a softening point of the resin to an endothermic maximum peak temperature thereof as measured by a differential scanning colorimeter (DSC), i.e., "softening point/endothermic maximum peak temperature". In general, the resin having a crystallinity index exceeding 1.4 is amorphous, and the resin having a crystallinity index less than 0.6 is less crystalline and contains a large amount of an amorphous moiety. In the present invention, the "amorphous resin" as used herein means those resins having a crystallinity index more than 1.4 or less than 0.6, and the "crystalline resin" as used herein means those resins having a crystallinity index of not less than 0.6, preferably not less than 0.7 and more preferably not less than 0.9, and also not more than 1.4 and preferably not more than 1.2.

The aforementioned "endothermic maximum peak temperature" represents the temperature of a peak having a largest peak area among endothermic peaks as observed under the conditions of the measuring method described in Examples below.

The crystallinity of the resin may be controlled by suitably adjusting the kinds and proportions of the raw material monomers as well as production conditions of the resin (for example, such as a reaction temperature, a reaction time and a cooling velocity), etc.

The "polyester-based resin" as used herein may also include a modified polyester resin that is obtained by modifying a polyester resin to such an extent that the resin undergoes substantially no deterioration in its properties. Examples of the modified polyester resin include a urethane-modified polyester resin obtained by modifying a polyester resin with a urethane bond, an epoxy-modified polyester resin obtained by modifying a polyester resin with an epoxy bond, and a composite resin containing a polyester component and an addition polymerization-based resin component.

The "bisphenol A" means 2,2-bis(4-hydroxyphenyl) propane.

Examples of the "carboxylic acid compound" include a carboxylic acid, an anhydride of the carboxylic acid and an alkyl ester of the carboxylic acid containing an alkyl group having not less than 1 and not more than 3 carbon atoms. Incidentally, the number of carbon atoms of the alkyl group contained in the alkyl ester does not include the number of carbon atoms contained in the carboxylic acid compound.

The "resin components of the toner" means those resin components contained in the toner of the present invention, which include the resin composition (P) and the resin composition (W).

The toner of the present invention contains the colorant, the resin composition (P) and the resin composition (W).

The toner of the present invention contains, for example, toner particles and external additives.

The toner particles preferably contains the colorant, the resin composition (P) and the resin composition (W).

Moreover, the toner particles may also contain, for example, a colorant derivative, a releasing agent, a charge control agent and other additives.

<Resin Composition (P)>

The resin composition (P) is in the form of a resin composition formed by subjecting an acid group-containing amorphous polyester-based resin (A) and an amine compound to condensation reaction. The resin composition (P) may contain, for example, a reaction product of the resin (A) and the amine compound and a by-product derived from the amine compound, as well as the unreacted resin (A) and the unreacted amine compound, and the like. It is considered that the reaction product of the resin (A) and the amine compound and the by-product derived from the amine compound acts as a dispersant for the colorant in the resin composition (P).

[Amorphous Polyester-Based Resin (A)]

The amorphous polyester-based resin (A) contains an acid group.

Examples of the acid group include a carboxy group and a sulfo group. Among these acid groups, preferred is a carboxy group.

Examples of the amorphous polyester-based resin (A) include an amorphous polyester resin, an amorphous composite resin containing a polyester resin segment and a vinyl-based resin segment. Among these resins, preferred is the amorphous polyester resin.

The aforementioned amorphous polyester resin is a polycondensate of an alcohol component (A-al) and a carboxylic acid component (A-ac). In the following, the alcohol component (A-al) and the carboxylic acid component (A-ac) which are contained in the aforementioned amorphous polyester resin are explained more specifically.

(Alcohol Component (A-al))

The alcohol component (A-al) preferably contains at least one compound selected from the group consisting of an alkyleneoxide adduct of bisphenol A (hereinafter also referred to merely as "BPA-AO") and an aliphatic diol having not less than 2 and not more than 6 carbon atoms, and more preferably contains BPA-AO. The BPA-AO is preferably represented by the following formula (I):

(I)

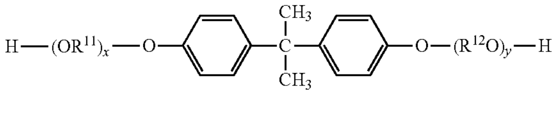

wherein $OR^{11}$ and $R^{12}O$ are respectively an alkyleneoxy group; $R^{11}$ and $R^{12}$ are each independently an alkylene group having not less than 1 and not more than 4 carbon atoms (preferably an ethylene group or a propylene group); and x and y respectively represent an average molar number of addition of an alkyleneoxide, and are each independently a positive number in which an average value of a sum of x and y is preferably not less than 1, more preferably not less than 1.5 and even more preferably not less than 2, and is also preferably not more than 16, more preferably not more than 8 and even more preferably not more than 4.

As the BPA-AO, preferred are a propyleneoxide adduct of bisphenol A (hereinafter also referred to merely as "BPA-PO") and an ethyleneoxide adduct of bisphenol A (hereinafter also referred to merely as "BPA-EO"), and more preferred is BPA-PO. More specifically, it is preferred that the alcohol component (A-al) contains BPA-PO. These BPA-AOs may be used alone or in combination of any two or more thereof.

The content of the BPA-AO in the alcohol component (A-al) is preferably not less than 80 mol %, more preferably not less than 90 mol %, even more preferably not less than 95 mol % and further even more preferably not less than 98 mol %, and is also not more than 100 mol %, and furthermore preferably 100 mol %.

In the case where the alcohol component (A-al) contains BPA-PO, the content of the BPA-PO in the alcohol component (A-al) is preferably not less than 80 mol %, more preferably not less than 90 mol %, even more preferably not less than 95 mol % and further even more preferably not less than 98 mol %, and is also not more than 100 mol %, and furthermore preferably 100 mol %.

The alcohol component (A-al) may also contain the other alcohol component that is different from the BPA-AO. Examples of the other alcohol component include an aliphatic diol, an alicyclic diol and a tri- or higher-valent polyhydric alcohol.

The number of carbon atoms in the aliphatic diol is preferably not less than 2, and is also preferably not more than 18, more preferably not more than 14, even more preferably not more than 10 and further even more preferably not more than 6.

Examples of the aliphatic diol include ethylene glycol, 1,2-propanediol, 1,3-propanediol, 1,2-butanediol, 1,3-butanediol, 1,4-butanediol, 2,3-butanediol, neopentyl glycol, 1,4-butenediol, 1,2-pentanediol, 1,4-pentanediol, 2,4-pentanediol, 1,5-pentanediol, 1,2-hexanediol, 1,5-hexanediol, 2,5-hexanediol, 1,6-hexanediol, 3,3-dimethyl-1,2-butanediol, 1,7-heptanediol, 1,8-octanediol, 1,9-nonanediol, 1,10-decanediol, 1,11-undecanediol, 1,12-dodecanediol, 1,13-tridecanediol and 1,14-tetradecanediol.

Examples of the alicyclic diol include hydrogenated bisphenol A, and an alkyleneoxide (having not less than 2 and not more than 4 carbon atoms) adduct (whose average molar number of addition of alkyleneoxide is not less than 2 and not more than 12) of the hydrogenated bisphenol A.

Examples of the tri- or higher-valent polyhydric alcohol include glycerin, pentaerythritol, trimethylolpropane, sorbitol and sorbitan.

Incidentally, from the viewpoint of well controlling a molecular weight or a softening point of the resin, the alcohol component (A-al) may also contain a monohydric alcohol.

These alcohol components may be used alone or in combination of any two or more thereof.

(Carboxylic Acid Component (A-ac))

Examples of the carboxylic acid component (A-ac) include a dicarboxylic acid compound and a tri- or higher-valent polycarboxylic acid compound.

Examples of the dicarboxylic acid compound include an aromatic dicarboxylic acid compound, an aliphatic dicarboxylic acid compound and an alicyclic dicarboxylic acid compound.

The number of carbon atoms of the dicarboxylic acid compound is preferably not less than 2 and more preferably not less than 3, and is also preferably not more than 30 and more preferably not more than 20.

Examples of the aromatic dicarboxylic acid compound include phthalic acid, isophthalic acid and terephthalic acid. Among these aromatic dicarboxylic acid compounds, preferred are isophthalic acid and terephthalic acid, and more preferred is terephthalic acid.

Examples of the aliphatic dicarboxylic acid compound include oxalic acid, malonic acid, maleic acid, fumaric acid, citraconic acid, itaconic acid, glutaconic acid, succinic acid, pentanedioic acid, adipic acid, sebacic acid, dodecanedioic acid, azelaic acid, and substituted succinic acids obtained by substituting succinic acid with an aliphatic hydrocarbon group having not less than 1 and not more than 20 carbon atoms. The number of carbon atoms of the aliphatic hydrocarbon group is preferably not less than 8 and more preferably not less than 9, and is also preferably not more than 16 and more preferably not more than 14. The aliphatic hydrocarbon group may be either a linear group or a branched group, and may also be either a saturated aliphatic hydrocarbon group or an unsaturated aliphatic hydrocarbon group. Examples of the substituted succinic acids obtained by substituting succinic acid with an aliphatic hydrocarbon group having not less than 1 and not more than 20 carbon atoms include octenyl succinic acid, nonenyl succinic acid, decenyl succinic acid, undecenyl succinic acid, dodecyl succinic acid, dodecenyl succinic acid, tridecenyl succinic acid, tetradecenyl succinic acid and tetrapropenyl succinic acid.

Examples of the alicyclic dicarboxylic acid compound include cyclohexanedicarboxylic acid.

Among these dicarboxylic acid compounds, the carboxylic acid component (A-ac) preferably contains the aromatic dicarboxylic acid compound, and more preferably contains terephthalic acid.

The content of the aromatic dicarboxylic acid compound in the carboxylic acid component (A-ac) is preferably not less than 50 mol %, more preferably not less than 60 mol %, even more preferably not less than 65 mol % and further even more preferably not less than 70 mol %, and is also not more than 100 mol %.

Examples of the tri- or higher-valent polycarboxylic acid compound include 1,2,4-benzenetricarboxylic acid (trimellitic acid), 2,5,7-naphthalenetricarboxylic acid and pyromellitic acid. Among these tri- or higher-valent polycarboxylic acid compounds contained in the carboxylic acid component (A-ac), preferred is trimellitic acid or trimellitic anhydride.

The content of the tri- or higher-valent polycarboxylic acid compound in the carboxylic acid component (A-ac) is preferably not more than 10 mol %, more preferably not more than 5 mol % and even more preferably not more than 1 mol %, and is furthermore preferably 0 mol %.

Incidentally, from the viewpoint of well controlling a molecular weight or a softening point of the resin, the carboxylic acid component (A-ac) may also appropriately contain a monovalent carboxylic acid.

These carboxylic acid components may be used alone or in combination of any two or more thereof.

The equivalent ratio of a carboxy group (COOH group) of the carboxylic acid component (A-ac) to a hydroxy group (OH group) of the alcohol component (A-al) [COOH group/OH group] is preferably not less than 0.7 and more preferably not less than 0.8, and is also preferably not more than 1.3, more preferably not more than 1.2 and even more preferably not more than 1.0.

(Properties of Resin (A))

The acid value of the resin (A) is preferably not less than 2 mgKOH/g, more preferably not less than 3 mgKOH/g and even more preferably not less than 5 mgKOH/g, and is also preferably not more than 40 mgKOH/g, more preferably not more than 30 mgKOH/g, even more preferably not more than 20 mgKOH/g, further even more preferably not more than 15 mgKOH/g and still further even more preferably not more than 10 mgKOH/g, from the viewpoint of well conducting the condensation reaction of the resin (A) with the amine compound, from the viewpoint of enhancing the interaction between the resin (A) and the colorant as well as from the viewpoint of further improving image density and chroma of the resulting toner.

The weight-average molecular weight of the resin (A) is preferably not less than 2,000, more preferably not less than 3,000 and even more preferably not less than 4,000, and is also preferably not more than 100,000, more preferably not more than 50,000, even more preferably not more than 10,000 and further even more preferably not more than 7,000, from the viewpoint of further improving image density and chroma of the resulting toner.

The softening point of the resin (A) is preferably not lower than 80° C., more preferably not lower than 90° C. and even more preferably not lower than 95° C., and is also preferably not higher than 130° C., more preferably not higher than 120° C. and even more preferably not higher than 110° C., from the viewpoint of further improving image density and chroma of the resulting toner.

The glass transition temperature of the resin (A) is preferably not lower than 40° C., more preferably not lower than 50° C. and even more preferably not lower than 55° C., and is also preferably not higher than 90° C., more preferably not higher than 80° C. and even more preferably not higher than 70° C., from the viewpoint of further improving image density and chroma of the resulting toner.

The acid value, weight-average molecular weight, softening point and glass transition temperature of the resin (A) may be appropriately controlled by suitably adjusting the kinds and proportions of the raw material monomers as well as production conditions of the resin such as a reaction temperature, a reaction time, a cooling velocity, etc. The values of these properties and conditions may be determined by the methods described in Examples below. Incidentally, in the case where the two or more kinds of resins are used in combination with each other as the resin (A), it is preferred that the values of the respective properties of a mixture of these resins fall within the aforementioned ranges.

(Production of Resin (A))

The resin (A) may be produced by a process including the step (a) of subjecting raw material monomers (A) containing the alcohol component (A-al) and the carboxylic acid component (A-ac) to polycondensation reaction.

In the step (a), the aforementioned polycondensation reaction may be conducted, if required, in the presence of an esterification catalyst such as tin (II) dioctylate, dibutyl tin oxide, titanium diisopropylate bis(triethanol aminate), etc., in an amount of not less than 0.01 part by mass and not more than 5 parts by mass on the basis of 100 parts by mass of a whole amount of the raw material monomers (A); and an esterification co-catalyst such as gallic acid (identical to 3,4,5-trihydroxybenzoic acid), etc., in an amount of not less than 0.001 part by mass and not more than 0.5 part by mass on the basis of 100 parts by mass of a whole amount of the raw material monomers (A).

In addition, when using a monomer having an unsaturated bond such as fumaric acid, etc., in the aforementioned polycondensation reaction, a radical polymerization inhibitor may also be used, if required, in the reaction in an amount of preferably not less than 0.001 part by mass and not more than 0.5 part by mass on the basis of 100 parts by mass of a whole amount of the raw material monomers (A). Examples of the radical polymerization inhibitor include 4-tert-butyl catechol.

The temperature used in the aforementioned polycondensation reaction is preferably not lower than 120° C., more preferably not lower than 160° C. and even more preferably not lower than 180° C., and is also preferably not higher than 260° C. and more preferably not higher than 240° C. Meanwhile, the polycondensation reaction may be carried out in an inert gas atmosphere.

[Amine Compound]

The amine compound is preferably a compound containing an amino group (including $—NH_2$, —NHR and —NRR') wherein R and R' are respectively a hydrocarbon group having not less than 1 and not more than 5 carbon atoms. The amine compound is a compound that may be incorporated into a molecular skeleton of the resin (A) by undergoing condensation reaction with the acid group of the resin (A).

The amine compound may contain a functional group other than an amino group. Examples of the functional group include a hydroxy group, a formyl group, an acetal group, an oxime group and a thiol group.

The amount of the amine compound used in the condensation reaction is preferably not less than 0.05 part by mass, more preferably not less than 0.1 part by mass and even more preferably not less than 0.5 part by mass, and is also preferably not more than 20 parts by mass, more preferably not more than 10 parts by mass, even more preferably not more than 7 parts by mass, further even more preferably not more than 5 parts by mass, still further even more preferably not more than 3 parts by mass and furthermore preferably not more than 2 parts by mass, on the basis of 100 parts by mass of the resin (A), from the viewpoint of further improving image density and chroma of the resulting toner.

Examples of the amine compound include a polyalkyleneimine, a polyallylamine, a (poly)ethylenepolyamine, an alkanolamine and an alkylamine.

As the polyalkyleneimine, preferred is a polyalkyleneimine containing an alkylene group having not less than 1 and not more than 5 carbon atoms, more preferred is a polyalkyleneimine containing an alkylene group having not less than 2 and not more than 4 carbon atoms, even more preferred is polyethyleneimine or polypropyleneimine, and further even more preferred is polyethyleneimine.

The number-average molecular weight of the polyalkyleneimine is preferably not less than 150, more preferably not less than 500, even more preferably not less than 800, further even more preferably not less than 1,000 and still further even more preferably not less than 2,000, and is also preferably not more than 10,000, more preferably not more than 5,000 and even more preferably not more than 4,000, from the viewpoint of further improving image density and chroma of the resulting toner.

The number-average molecular weight may be determined by the method described in Examples below.

Examples of the polyallylamine include polymers containing an amino group at a side chain thereof, such as a homopolymer or a copolymer of an allylamine compound, such as allylamine, dimethyl allylamine, diallylamine, etc.

The weight-average molecular weight of the polyallylamine is preferably not less than 800, more preferably not less than 1,000 and even more preferably not less than 1,300, and is also preferably not more than 10,000, more preferably not more than 5,000, even more preferably not more than 4,000, further even more preferably not more than 3,000 and still further even more preferably not more than 2,000, from the viewpoint of further improving image density and chroma of the resulting toner.

The weight-average molecular weight may be determined by the method described in Examples below.

Examples of the (poly)ethylenepolyamine include ethylenediamine, diethylenetriamine, triethylenetetramine, tetraethylenepentamine, pentaethylenehexamine and the like. Among these (poly)ethylenepolyamines, diethylenetriamine, triethylenetetramine and tetraethylenepentamine are preferred from the viewpoint of further improving image density and chroma of the resulting toner.

As the alkanolamine, preferred is an alkanolamine having not less than 2 and not more than 9 carbon atoms. Examples of the alkanolamine include primary alkanolamines such as monoethanolamine, monopropanolamine, monobutanolamine, etc.; secondary alkanolamines, e.g., monoalkanol secondary amines such as N-methyl ethanolamine, N-methyl propanolamine, etc., dialkanol secondary amines such as diethanolamine, diisopropanolamine, etc., and the like; and tertiary alkanolamines, e.g., monoalkanol tertiary amines such as N,N-dimethyl ethanolamine, N,N-dimethyl propanolamine, N,N-diethyl ethanolamine, etc., dialkanol tertiary amines such as N-methyl diethanolamine, N-ethyl diethanolamine, etc., trialkanol tertiary amines such as triethanolamine, triisopropanolamine, etc., and the like. Among these alkanolamines, preferred are tertiary alkanolamines having not less than 2 and not more than 9 carbon atoms, more preferred are monoalkanol tertiary amines having not less than 2 and not more than 9 carbon atoms, and even more preferred is N,N-dimethyl ethanolamine.

As the alkylamine, preferred are those alkylamines having not less than 1 and not more than 6 carbon atoms. Examples of the alkylamine include primary amines such as propylamine, butylamine, hexylamine, etc.; and secondary amines such as diethylamine, dipropylamine, etc.

These amine compounds may be used alone or in combination of any two or more thereof.

Among these amine compounds, from the viewpoint of further improving image density and chroma of the resulting toner, preferred are those amine compounds containing at least one compound selected from the group consisting of a polyalkyleneimine containing an alkylene group having not less than 1 and not more than 5 carbon atoms, a polyallylamine, a (poly)ethylenepolyamine, an alkanolamine having not less than 2 and not more than 9 carbon atoms, and an alkylamine having not less than 1 and not more than 6 carbon atoms; more preferred are those amine compounds containing at least one compound selected from the group consisting of a polyalkyleneimine containing an alkylene group having not less than 1 and not more than 5 carbon atoms, a polyallylamine, a (poly)ethylenepolyamine and a tertiary alkanolamine having not less than 2 and not more than 9 carbon atoms; even more preferred are those amine compounds containing at least one compound selected from the group consisting of a polyalkyleneimine containing an alkylene group having not less than 1 and not more than 5 carbon atoms, a polyallylamine and a tertiary alkanolamine having not less than 2 and not more than 9 carbon atoms; further even more preferred are those amine compounds containing at least one compound selected from the group consisting of a polyalkyleneimine containing an alkylene group having not less than 1 and not more than 5 carbon atoms and a polyallylamine; still further even more preferred are those amine compounds containing a polyalkyleneimine containing an alkylene group having not less than 1 and not more than 5 carbon atoms; and furthermore preferred are those amine compounds containing the polyethyleneimine.

In the case where the amine compound contains the polyalkyleneimine containing an alkylene group having not less than 1 and not more than 5 carbon atoms, the whole amount of the polyalkyleneimine containing an alkylene group having not less than 1 and not more than 5 carbon atoms which is contained in the amine compound is preferably not less than 70% by mass, more preferably not less than 80% by mass and even more preferably not less than 90% by mass, and is also not more than 100% by mass, and furthermore preferably 100% by mass.

(Properties of Resin Composition (P))

The softening point of the resin composition (P) is preferably not lower than 80° C., more preferably not lower than 90° C. and even more preferably not lower than 95° C., and is also preferably not higher than 130° C., more preferably not higher than 120° C. and even more preferably not higher than 110° C., from the viewpoint of further improving image density and chroma of the resulting toner.

The glass transition temperature of the resin composition (P) is preferably not lower than 40° C., more preferably not lower than 50° C. and even more preferably not lower than 55° C., and is also preferably not higher than 90° C., more preferably not higher than 80° C. and even more preferably not higher than 70° C., from the viewpoint of further improving image density and chroma of the resulting toner.

The softening point and glass transition temperature of the resin composition (P) may be appropriately controlled by suitably adjusting the kinds and proportions of the raw materials as well as production conditions of the resin composition, etc., such as a reaction temperature, a reaction time, a cooling velocity, etc. The values of these properties and conditions may be measured by the methods described in Examples below. Incidentally, in the case where the two or more kinds of resin compositions are used in combination with each other as the resin composition (P), it is preferred that the values of the respective properties of a mixture of these resin compositions fall within the aforementioned ranges.

(Production of Resin Composition (P))

The resin composition (P) may be produced by subjecting the acid group-containing amorphous polyester-based resin (A) and the amine compound to condensation reaction, as described above.

The process for producing the resin composition (P) includes, for example, the following step 1.

Step 1: subjecting the acid group-containing amorphous polyester-based resin (A) and the amine compound to condensation reaction to obtain the resin composition (P).

The temperature used in the condensation reaction in the step 1 is preferably not lower than 50° C., more preferably not lower than 100° C. and even more preferably not lower than 130° C., and is also preferably not higher than 235° C., more preferably not higher than 200° C. and even more preferably not higher than 170° C.

The amount of the amine compound compounded in the step 1 is preferably not less than 0.05 part by mass, more preferably not less than 0.1 part by mass and even more preferably not less than 0.5 part by mass, and is also preferably not more than 20 parts by mass, more preferably not more than 10 parts by mass, even more preferably not more than 7 parts by mass, further even more preferably not more than 5 parts by mass, still further even more preferably not more than 3 parts by mass and furthermore preferably not more than 2 parts by mass, on the basis of 100 parts by mass of the resin (A), from the viewpoint of improving dispersibility of the colorant as well as from the viewpoint of further improving image density and chroma of the resulting toner.

The content of the resin composition (P) in the toner of the present invention as calculated in terms of a content of the resin composition (P) on the basis of a total amount of the resin components contained in the toner is preferably not less than 10% by mass, more preferably not less than 20% by mass and even more preferably not less than 30% by mass, and is also preferably not more than 60% by mass, more preferably not more than 50% by mass and even more preferably not more than 40% by mass, from the viewpoint of improving dispersibility of the colorant as well as from the viewpoint of further improving image density and chroma of the resulting toner.

<Resin Composition (W)>

The resin composition (W) is a resin composition formed by subjecting an alcohol component (W-al), a carboxylic acid component (W-ac) and a hydrocarbon wax containing at least one functional group selected from the group consisting of a hydroxy group and a carboxy group to condensation reaction.

(Alcohol Component (W-al))

The alcohol component (W-al) preferably contains at least one compound selected from the group consisting of an alkyleneoxide adduct of bisphenol A (BPA-AO) and an aliphatic diol having not less than 2 and not more than 6 carbon atoms, and more preferably contains BPA-AO. As the BPA-AO, preferred are those BPA-AOs represented by the aforementioned formula (I).

The BPA-AO is preferably BPA-PO or BPA-EO, and more preferably BPA-PO. More specifically, it is preferred that the alcohol component (W-al) contains BPA-PO. These BPA-AOs may be used alone or in combination of any two or more thereof.

The content of the BPA-AO in the alcohol component (W-al) is preferably not less than 80 mol %, more preferably not less than 90 mol %, even more preferably not less than 95 mol % and further even more preferably not less than 98 mol %, and is also not more than 100 mol %, and furthermore preferably 100 mol %.

In the case where the alcohol component (W-al) contains BPA-PO, the content of the BPA-PO in the alcohol component (W-al) is preferably not less than 80 mol %, more preferably not less than 90 mol %, even more preferably not less than 95 mol % and further even more preferably not less than 98 mol %, and is also not more than 100 mol %, and furthermore preferably 100 mol %.

The alcohol component (W-al) may also contain the other alcohol component that is different from the BPA-AO. Examples of the other alcohol component include the aliphatic diols, the alicyclic diols and the tri- or higher-valent polyhydric alcohols as illustrated with respect to the aforementioned alcohol component (A-al).

Incidentally, from the viewpoint of well controlling a molecular weight or a softening point of the resulting polyester, the alcohol component (W-al) may also contain a monohydric alcohol.

These alcohol components may be used alone or in combination of any two or more thereof.

(Carboxylic Acid Component (W-ac))

Examples of the carboxylic acid component (W-ac) include a dicarboxylic acid compound and a tri- or higher-valent polycarboxylic acid compound.

Examples of the dicarboxylic acid compound include the aromatic dicarboxylic acid compound, the aliphatic dicarboxylic acid compound and the alicyclic dicarboxylic acid compound as illustrated with respect to the aforementioned carboxylic acid component (A-ac). Among these dicarboxylic acid compounds, the carboxylic acid component (W-ac) preferably contains the aromatic dicarboxylic acid compound, and more preferably contains terephthalic acid.

The content of the aromatic dicarboxylic acid compound in the carboxylic acid component (W-ac) is preferably not less than 50 mol %, more preferably not less than 60 mol %, even more preferably not less than 65 mol % and further even more preferably not less than 70 mol %, and is also not more than 100 mol %, and furthermore preferably 100 mol %.

Examples of the tri- or higher-valent polycarboxylic acid compound include such compounds as illustrated with respect to the aforementioned carboxylic acid component (A-ac). Among these tri- or higher-valent polycarboxylic acid compounds, preferred is trimellitic acid or trimellitic anhydride.

The content of the tri- or higher-valent polycarboxylic acid compound in the carboxylic acid component (W-ac) is preferably not more than 10 mol %, more preferably not more than 5 mol % and even more preferably not more than 1 mol %, and is also furthermore preferably 0 mol %.

These carboxylic acid components may be used alone or in combination of any two or more thereof.

The equivalent ratio of a carboxy group (COOH group) of the carboxylic acid component (A-ac) to a hydroxy group (OH group) of the alcohol component (W-al) [COOH group/OH group] is preferably not less than 0.7 and more preferably not less than 0.8, and is also preferably not more than 1.3, more preferably not more than 1.2 and even more preferably not more than 1.0.

(Hydrocarbon Wax Containing at Least One Functional Group Selected from the Group Consisting of Hydroxy Group and Carboxy Group)

As the hydrocarbon wax containing at least one functional group selected from the group consisting of a hydroxy group and a carboxy group as used in the present invention, preferred are those hydrocarbon waxes having a hydroxy value based on a hydroxy group thereof which is identical to or higher than an acid value based on a carboxy group thereof; more preferred are those hydrocarbon waxes having a hydroxy value based on a hydroxy group thereof which is higher than an acid value based on a carboxy group thereof; even more preferred are those hydrocarbon waxes containing a hydroxy group; and further even more preferred are those hydrocarbon waxes containing a hydroxy group only.

Incidentally, in the present invention, the hydrocarbon wax is not included in the alcohol component (W-al) and the carboxylic acid component (W-ac).

Examples of the hydroxy group-containing hydrocarbon wax include those hydrocarbon waxes that are produced by modifying a hydrocarbon wax such as a paraffin wax, a Fischer-Tropsch wax, a microcrystalline wax, a polyethylene wax, etc., by subjecting the hydrocarbon wax to oxidation treatment. The oxidation treatment may be conducted, for example, by the methods described in JP 62-79267A and JP 2010-197979A, etc.

More specifically, the oxidation treatment is conducted by the method of subjecting the hydrocarbon wax to liquid phase oxidation with an oxygen-containing gas in the presence of boric acid. Examples of commercially available products of the hydroxy group-containing hydrocarbon wax include "UNILIN 700", "UNILIN 425" and "UNILIN 550" all available from BAKER PETROLITE Corporation; "Paracohol 6420", "Paracohol 6470" and "Paracohol 6490" all available from Nippon Seiro Co., Ltd.; and the like.

Examples of the carboxy group-containing hydrocarbon wax include acid-modified hydrocarbon waxes.

The acid-modified hydrocarbon waxes may be produced, for example, by introducing a carboxy group into a hydrocarbon wax such as a paraffin wax, a Fischer-Tropsch wax, etc., by acid modification thereof. Examples of the acid modification method include those methods described in JP 2006-328388A and JP 2007-84787A.

More specifically, the carboxy group may be introduced into the hydrocarbon wax by adding an organic peroxide such as dicumyl peroxide as a reaction initiator and an unsaturated bond-containing carboxylic acid compound to a melt of the hydrocarbon wax as a raw material to allow these compounds to react with each other. Examples of commercially available products of the carboxy group-containing hydrocarbon wax include a maleic anhydride-modified ethylene-propylene copolymer "Hi-WAX 1105A" available from Mitsui Chemicals, Inc.

The number-average molecular weight of the hydrocarbon wax containing at least one functional group selected from the group consisting of a hydroxy group and a carboxy group is preferably not less than 400 and more preferably not less than 500, and is also preferably not more than 2,000 and more preferably not more than 1,500.

The melting point of the hydrocarbon wax containing at least one functional group selected from the group consisting of a hydroxy group and a carboxy group is preferably not lower than 60° C. and more preferably not lower than 70° C., and is also preferably not higher than 100° C. and more preferably not higher than 90° C.

In the case where the aforementioned hydrocarbon wax containing at least one functional group selected from the group consisting of a hydroxy group and a carboxy group is a hydroxy group-containing hydrocarbon wax, the hydroxy value of the hydrocarbon wax is preferably not less than 30 mgKOH/g and more preferably not less than 50 mgKOH/g, and is also preferably not more than 300 mgKOH/g and more preferably not more than 200 mgKOH/g.

In the case where the aforementioned hydrocarbon wax containing at least one functional group selected from the group consisting of a hydroxy group and a carboxy group is a carboxy group-containing hydrocarbon wax, the acid value of the hydrocarbon wax is preferably not less than 30 mgKOH/g and more preferably not less than 50 mgKOH/g, and is also preferably not more than 300 mgKOH/g and more preferably not more than 200 mgKOH/g.

The amount of the hydrocarbon wax containing at least one functional group selected from the group consisting of a hydroxy group and a carboxy group as calculated assuming that a theoretical yield of a polyester obtained from the alcohol component (W-al) and the carboxylic acid component (W-ac) is 100 parts by mass is preferably not less than 1 part by mass, more preferably not less than 2 parts by mass and even more preferably not less than 4 parts by mass, and is also preferably not more than 10 parts by mass and more preferably not more than 7 parts by mass, from the viewpoint of improving wettability between the resin composition (W) and the colorant, from the viewpoint of improving dispersibility of the colorant as well as from the viewpoint of further improving image density and chroma of the resulting toner.

Incidentally, the theoretical yield of the polyester obtained from the alcohol component (W-al) and the carboxylic acid component (W-ac) means a mass of the polyester obtained assuming that a reaction rate of the polycondensation reaction is 100%, and is defined as a mass calculated by subtracting a theoretical amount of reaction water produced and discharged by the polycondensation reaction from a total amount of the alcohol component and the carboxylic acid component.

(Properties of Resin Composition (W))

The acid value of the resin composition (W) is preferably not less than 0.5 mgKOH/g, more preferably not less than 1 mgKOH/g and even more preferably not less than 1.5 mgKOH/g, and is also preferably not more than 30 mgKOH/g, more preferably not more than 20 mgKOH/g, even more preferably not more than 10 mgKOH/g, further even more preferably not more than 5 mgKOH/g and still further even more preferably not more than 3 mgKOH/g, from the viewpoint of further improving image density and chroma of the resulting toner.

The weight-average molecular weight of the resin composition (W) is preferably not less than 2,000, more preferably not less than 3,000 and even more preferably not less than 4,000, and is also preferably not more than 100,000, more preferably not more than 50,000 and even more preferably not more than 10,000, from the viewpoint of further improving image density and chroma of the resulting toner.

The softening point of the resin composition (W) is preferably not lower than 80° C., more preferably not lower than 85° C. and even more preferably not lower than 90° C., and is also preferably not higher than 130° C., more preferably not higher than 120° C. and even more preferably not higher than 110° C., from the viewpoint of further improving image density and chroma of the resulting toner.

The glass transition temperature of the resin composition (W) is preferably not lower than 40° C., more preferably not lower than 45° C. and even more preferably not lower than 47° C., and is also preferably not higher than 90° C., more preferably not higher than 80° C., even more preferably not higher than 70° C. and further even more preferably not higher than 60° C., from the viewpoint of further improving image density and chroma of the resulting toner.

The acid value, weight-average molecular weight, softening point and glass transition temperature of the resin composition (W) may be appropriately controlled by suitably adjusting the kinds and proportions of the raw material monomers as well as production conditions of the resin composition, etc., such as a reaction temperature, a reaction time, a cooling velocity, etc. The values of these properties and conditions may be determined by the methods described in Examples below. Incidentally, in the case where the two or more kinds of resin compositions are used in combination with each other as the resin composition (W), it is preferred that the values of the respective properties of a mixture of these resin compositions fall within the aforementioned ranges.

(Production of Resin Composition (W))

The resin composition (W) may be produced, for example, by a process including the step (w) of subjecting the alcohol component (W-al) and the carboxylic acid component (W-ac) to polycondensation reaction in the presence of the hydrocarbon wax containing at least one functional group selected from the group consisting of a hydroxy group and a carboxy group.

In the step (w), the polycondensation reaction may be conducted, if required, in the presence of the esterification catalyst as used in the aforementioned step (a) in an amount of not less than 0.01 part by mass and not more than 5 parts by mass on the basis of 100 parts by mass of a total amount of the alcohol component (W-al) and the carboxylic acid component (W-ac); and the esterification co-catalyst such as gallic acid, etc., as used in the aforementioned step (a) in an amount of not less than 0.01 part by mass and not more than 0.7 part by mass on the basis of 100 parts by mass of a total amount of the alcohol component (W-al) and the carboxylic acid component (W-ac).

In addition, when using a monomer having an unsaturated bond such as fumaric acid, etc., in the aforementioned polycondensation reaction, a radical polymerization inhibitor may be used, if required, in the reaction in an amount of preferably not less than 0.001 part by mass and not more than 0.5 part by mass on the basis of 100 parts by mass of a total amount of the alcohol component (W-al) and the carboxylic acid component (W-ac). Examples of the radical polymerization inhibitor include 4-tert-butyl catechol.

The temperature used in the aforementioned polycondensation reaction is preferably not lower than 120° C., more preferably not lower than 160° C. and even more preferably not lower than 180° C., and is also preferably not higher than 260° C. and more preferably not higher than 240° C. Meanwhile, the polycondensation reaction may be carried out in an atmosphere of an inert gas.

The content of the resin composition (W) in the toner of the present invention as calculated in terms of a content of the resin composition (W) on the basis of a total amount of the resin components contained in the toner is preferably not less than 10% by mass, more preferably not less than 20% by mass and even more preferably not less than 25% by mass, and is also preferably not more than 60% by mass, more preferably not more than 50% by mass, even more preferably not more than 40% by mass and further even more preferably not more than 35% by mass, from the viewpoint of improving dispersibility of the colorant as well as from the viewpoint of further improving image density and chroma of the resulting toner.

The resin components in the toner of the present invention may also contain other resins such as an amorphous polyester-based resin, a crystalline polyester-based resin, etc., in addition to the resin composition (P) and the resin composition (W). However, the total content of the resin composition (P) and the resin composition (W) in the toner of the present invention as calculated in terms of a total content of these resin compositions on the basis of a total amount of the resin components contained in the toner is preferably not less than 40% by mass, more preferably not less than 50% by mass and even more preferably not less than 60% by mass, and is also preferably not more than 90% by mass, more preferably not more than 80% by mass and even more preferably not more than 70% by mass.

The mass ratio of the content of the resin composition (P) to the content of the resin composition (W) [resin composition (P)/resin composition (W)] in the toner of the present invention is preferably not less than 0.3, more preferably not less than 0.5, even more preferably not less than 1 and further even more preferably not less than 1.1, and is also preferably not more than 3, more preferably not more than 2, even more preferably not more than 1.5 and further even more preferably not more than 1.3.

<Amorphous Polyester-Based Resin (B)>

The toner of the present invention preferably further contains an amorphous polyester-based resin (B) (hereinafter also referred to merely as a "resin (B)") in addition to the resin composition (P) and the resin composition (W). The resin (B) may be the same resin as the aforementioned resin (A), but is preferably a resin having a softening point that is different from that of the aforementioned resin (A) and more preferably a resin having a softening point higher than that of the aforementioned resin (A).

The resin (B) is an amorphous polyester resin as a polycondensate of an alcohol component (B-al) and a carboxylic acid component (B-ac).

Examples of the alcohol component (B-al) and the carboxylic acid component (B-ac) of the resin (B) are the same as those illustrated as to the alcohol component (A-al) and the carboxylic acid component (A-ac) of the aforementioned resin (A), respectively.

The alcohol component (B-al) is preferably BPA-AO.

The BPA-AO is preferably BPA-PO or BPA-EO and more preferably BPA-PO. More specifically, it is preferred that the alcohol component (B-al) contains BPA-PO. These BPA-AOs may be used alone or in combination of any two or more thereof.

The content of the BPA-AO in the alcohol component (B-al) is preferably not less than 80 mol %, more preferably not less than 90 mol %, even more preferably not less than 95 mol % and further even more preferably not less than 98 mol %, and is also not more than 100 mol %, and furthermore preferably 100 mol %.

In the case where the alcohol component (B-al) contains BPA-PO, the content of the BPA-PO in the alcohol component (B-al) is preferably not less than 80 mol %, more preferably not less than 90 mol %, even more preferably not less than 95 mol % and further even more preferably not less than 98 mol %, and is also not more than 100 mol %, and furthermore preferably 100 mol %.

As the carboxylic acid component (B-ac), preferred are an aromatic dicarboxylic acid compound, an aliphatic dicarboxylic acid compound and a tri- or higher-valent polycarboxylic acid compound.

As the aromatic dicarboxylic acid compound, preferred are isophthalic acid and terephthalic acid, and more preferred is terephthalic acid.

The content of the aromatic dicarboxylic acid compound in the carboxylic acid component (B-ac) is preferably not less than 20 mol %, more preferably not less than 30 mol % and even more preferably not less than 40 mol %, and is also preferably not more than 70 mol %, more preferably not more than 60 mol % and even more preferably not more than 50 mol %.

As the aliphatic dicarboxylic acid compound, preferred is adipic acid.

The content of the aliphatic dicarboxylic acid compound in the carboxylic acid component (B-ac) is preferably not less than 10 mol %, more preferably not less than 20 mol % and even more preferably not less than 30 mol %, and is also preferably not more than 60 mol %, more preferably not more than 50 mol % and even more preferably not more than 40 mol %.

As the tri- or higher-valent polycarboxylic acid compound, preferred is trimellitic acid or trimellitic anhydride.

The content of the tri- or higher-valent polycarboxylic acid compound in the carboxylic acid component (B-ac) is preferably not less than 1 mol %, more preferably not less than 10 mol % and even more preferably not less than 20 mol %, and is also preferably not more than 40 mol %, more preferably not more than 35 mol % and even more preferably not more than 30 mol %.

(Properties of Resin (B))

The acid value of the resin (B) is preferably not less than 2 mgKOH/g, more preferably not less than 5 mgKOH/g and even more preferably not less than 10 mgKOH/g, and is also preferably not more than 40 mgKOH/g, more preferably not more than 30 mgKOH/g and even more preferably not more than 25 mgKOH/g.

The softening point of the resin (B) is preferably not lower than 80° C., more preferably not lower than 90° C., even more preferably not lower than 100° C., further even more preferably not lower than 110° C., still further even more preferably not lower than 115° C., furthermore preferably not lower than 120° C. and even furthermore preferably higher than 120° C., and is also preferably not higher than 170° C., more preferably not higher than 160° C., even more preferably not higher than 150° C., further even more preferably not higher than 140° C. and still further even more preferably not higher than 130° C., from the viewpoint of further improving image density and chroma of the resulting toner.

In the case where the softening point of the resin (A) is not lower than 80° C. and not higher than 120° C., the softening point of the resin (B) is preferably higher than 120° C., more preferably not lower than 125° C. and even more preferably not lower than 130° C., and is also preferably not higher than 170° C., more preferably not higher than 150° C. and even more preferably not higher than 140° C.

The difference between the softening point of the resin (A) and the softening point of the resin (B) is preferably not less than 5° C., more preferably not less than 10° C., even more preferably not less than 20° C. and further even more preferably not less than 30° C., and is also preferably not more than 60° C., more preferably not more than 50° C. and even more preferably not more than 40° C.

The glass transition temperature of the resin (B) is preferably not lower than 40° C., more preferably not lower than 45° C. and even more preferably not lower than 50° C., and is also preferably not higher than 90° C., more preferably not higher than 80° C., even more preferably not higher than 70° C. and further even more preferably not higher than 60° C.

The acid value, softening point and glass transition temperature of the resin (B) may be appropriately controlled by suitably adjusting the kinds and proportions of the raw material monomers as well as production conditions of the resin, etc., such as a reaction temperature, a reaction time, a cooling velocity, etc. The values of these properties and conditions may be measured by the methods described in Examples below. Incidentally, in the case where the two or more kinds of resins are used in combination with each other as the resin (B), it is preferred that the values of the respective properties of a mixture of these resins fall within the aforementioned ranges.

The content of the resin (B) in the toner of the present invention as calculated in terms of a content of the resin (B) on the basis of a total amount of the resin components contained in the toner is preferably not less than 10% by mass, more preferably not less than 20% by mass and even more preferably not less than 30% by mass, and is also preferably not more than 60% by mass, more preferably not more than 50% by mass and even more preferably not more than 40% by mass.

<Crystalline Polyester-Based Resin (C)>

The toner of the present invention may further contain a crystalline polyester-based resin (C) (hereinafter also referred to merely as a "resin (C)") from the viewpoint of improving low-temperature fusing properties of the resulting toner.

The resin (C) is preferably an acid group-containing crystalline polyester-based resin.

As the resin (C), there may be mentioned, for example, a crystalline polyester resin, and a crystalline composite resin containing a polyester resin segment and a vinyl-based resin segment. Examples of the crystalline polyester resin include polycondensates obtained from an alcohol component containing an α,ω-aliphatic diol having not less than 2 and not more than 16 carbon atoms and a carboxylic acid component containing an aliphatic dicarboxylic acid compound having not less than 2 and not more than 14 carbon atoms. More concretely, as the crystalline polyester resin, there may be mentioned, for example, those polyester resins described in JP 2016-45358A.

In the case where the toner of the present invention further contains the resin (C), the content of the resin (C) in the toner of the present invention as calculated in terms of a content of the resin (C) on the basis of a total amount of the resin components contained in the toner is preferably not less than 0.1% by mass, more preferably not less than 0.5% by mass and even more preferably not less than 1% by mass, and is also preferably not more than 20% by mass, more preferably not more than 10% by mass and even more preferably not more than 5% by mass.

The total content of the resin components in the toner of the present invention is preferably not less than 50% by mass, more preferably not less than 65% by mass and even more preferably not less than 80% by mass, and is also preferably not more than 98% by mass, more preferably not more than 94% by mass and even more preferably not more than 90% by mass.

<Colorant>

The colorant may be either a pigment or a dye.

Examples of the pigment include azo pigments, phthalocyanine pigments, condensed polycyclic pigments and lake pigments.

Specific examples of the azo pigments include insoluble azo pigments such as C.I. Pigment Red 3, etc., soluble azo pigments such as C.I. Pigment Red 48:1, etc., and condensed azo pigments such as C.I. Pigment Red 144, etc.

Specific examples of the phthalocyanine pigments include copper phthalocyanine pigments such as C.I. Pigment Blue 15:3, etc., and polyhalogenated zinc phthalocyanine pigments such as C.I. Pigment Green 58, etc.

Specific examples of the condensed polycyclic pigments include anthraquinone-based pigments such as C.I. Pigment Red 177, etc., perylene-based pigments such as C.I. Pigment Red 123, etc., perinone-based pigments such as C.I. Pigment Orange 43, etc., quinacridone-based pigments such as C.I. Pigment Red 122, etc., naphthol-based pigments such as C.I. Pigment Red 269, etc., dioxazine-based pigments such as C.I. Pigment Violet 23, etc., isoindolinone-based pigments such as C.I. Pigment Yellow 139, C.I. Pigment Yellow 185, etc., isoindoline-based pigments such as C.I. Pigment Orange 66, etc., quinophthalone-based pigments such as C.I. Pigment Yellow 138, etc., nickel azo complex-based pigments such as C.I. Pigment Yellow 150, etc., indigo-based pigments such as C.I. Pigment Red 88, etc., metal complex pigments such as C.I. Pigment Green 8, etc., and diketopyrrolopyrrole-based pigments such as C.I. Pigment Red 254, C.I. Pigment Red 255, C.I. Pigment Orange 71, etc.

Specific examples of the lake pigments include C.I. Pigment Red 57:1.

Among these pigments, from the viewpoint of further improving image density and chroma of the resulting toner, preferred are phthalocyanine pigments, quinacridone-based pigments, isoindolinone-based pigments, naphthol-based pigments and lake pigments; more preferred are phthalocyanine pigments, quinacridone-based pigments and isoindolinone-based pigments; even more preferred are phthalocyanine pigments; and further even more preferred are copper phthalocyanine pigments such as C.I. Pigment Blue 15:3, etc.

Meanwhile, in the toner of the present invention, when using the pigment as the colorant, the resin composition (P) serves for improving fine atomization of the pigment in the toner as described above, and furthermore the resin composition (W) serves for improving wettability between the pigment and the resin composition (W), so that it is possible to exhibit the effect of improving dispersibility of the pigment in the resulting toner. For this reason, in the present invention, not only the phthalocyanine pigments, but also the quinacridone-based pigments or naphthol-based pigments which have been conventionally insufficient in pigment dispersibility, are capable of exhibiting good pigment dispersibility in the toner.

Examples of the dye include azine-based dyes, anthraquinone-based dyes, perinone-based dyes and rhodamine dyes. Specific examples of the dye include C.I. Solvent Black 5, C.I. Solvent Black 7, Spirit Black SB, Toluidine Blue, C.I. Solvent Blue 11, C.I. Solvent Blue 12, C.I. Solvent Blue 35, C.I. Solvent Blue 59, C.I. Solvent Blue 74, 1-aminoanthraquinone, 2-aminoanthraquinone, hydroxyethylaminoanthraquinone, C.I. Solvent Violet 47, Solvent Orange 60, Solvent Orange 78, Solvent Orange 90, Solvent Violet 29, Solvent Red 135, Solvent Red 162, Solvent Red 179 and Rhodaimine-B Base.

Among these colorants, from the viewpoint of more sufficiently acquiring advantageous effects of the present invention, preferred are the pigments. The hue of the colorant is not particularly limited, and as the colorant, there may be used any chromatic pigments such as a yellow pigment, a magenta pigment, a cyan pigment, a blue pigment, a red pigment, an orange pigment, a green pigment, etc. These colorants may be used alone or in combination of any two or more thereof.

The content of the colorant in the toner is preferably not less than 1 part by mass, more preferably not less than 2 parts by mass, even more preferably not less than 3 parts by mass, further even more preferably not less than 5 parts by mass, still further even more preferably not less than 7 parts by mass, furthermore preferably not less than 10 parts by mass and even furthermore preferably more than 10 parts by mass, and is also preferably not more than 40 parts by mass, more preferably not more than 30 parts by mass and even more preferably not more than 15 parts by mass, on the basis of 100 parts by mass of a whole amount of the resin components contained in the toner, from the viewpoint of improving image density of the resulting toner.

<Colorant Derivative>

The toner of the present invention may also contain a colorant derivative. As the colorant derivative, there may be mentioned, for example, a colorant into which an acid group or a basic group is introduced, or a salt thereof.

The colorant derivative is preferably a colorant into which a sulfo group is introduced, or a salt thereof.

In the case where C.I. Pigment Blue 15:3 is used as the colorant, as the colorant derivative, preferred is a sulfo group-introduced copper phthalocyanine compound or a salt thereof.

Examples of the aforementioned salt include a halide salt, an amine salt and a quaternary ammonium salt.

As the colorant derivative, preferred is a sulfonated copper phthalocyanine or a salt thereof.

Examples of commercially available products of the colorant derivative include "SOLSPERSE"series products such as" SOLSPERSE 5000S" and "SOLSPERSE 22000" both available from Lubrizol Japan Limited, and the like.

In the case where the toner of the present invention contains the colorant derivative, the content of the colorant derivative in the toner is preferably not less than 0.5 part by mass, more preferably not less than 1 part by mass and even more preferably not less than 2 parts by mass, and is also preferably not more than 15 parts by mass and more preferably not more than 10 parts by mass, on the basis of 100 parts by mass of the colorant, from the viewpoint of improving image density of the resulting toner.

<Releasing Agent>

The toner of the present invention may also contain a releasing agent.

Examples of the releasing agent include a polypropylene wax, a polyethylene wax and a polypropylene/polyethylene copolymer wax; hydrocarbon-based waxes such as a microcrystalline wax, a paraffin wax, a Fischer-Tropsch wax, a Sasol wax, etc., or oxides of these hydrocarbon-based waxes; ester-based waxes such as a carnauba wax, a montan wax or deacidified waxes thereof, fatty acid ester waxes, etc.; and fatty acid amides, fatty acids, higher alcohols and fatty acid metal salts. These releasing agents may be used alone or in combination of any two or more thereof.

The melting point of the releasing agent is preferably not lower than 60° C., more preferably not lower than 70° C. and even more preferably not lower than 75° C., and is also preferably not higher than 150° C., more preferably not higher than 130° C. and even more preferably not higher than 100° C.

The content of the releasing agent in the toner is preferably not less than 0.1 part by mass, more preferably not less than 0.5 part by mass and even more preferably not less than 0.8 part by mass, and is also preferably not more than 10 parts by mass, more preferably not more than 8 parts by mass and even more preferably not more than 5 parts by mass, on the basis of 100 parts by mass of a whole amount of the resin components contained in the toner.

<Charge Control Agent>

The toner of the present invention may also contain a charge control agent. The charge control agent contained in the toner may be either a charge control agent for positive charging or a charge control agent for negative charging.

Examples of the charge control agent for positive charging include Nigrosine dyes, for example, such as "Nigrosine Base EX", "Oil Black BS", "Oil Black SO", "BONTRON (registered trademark) N-01", "BONTRON (registered trademark) N-04", "BONTRON (registered trademark) N-07", "BONTRON (registered trademark) N-09" and "BONTRON (registered trademark) N-11" all commercially available from Orient Chemical Industries Co., Ltd., and the like; triphenylmethane-based dyes containing a tertiary amine as a side chain thereof, quaternary ammonium salt compounds, for example, such as "BONTRON (registered trademark) P-51" commercially available from Orient Chemical Industries Co., Ltd., cetyltrimethylammonium bromide. "COPY CHARGE PX VP435" commercially available from Clariant AG, and the like; polyamine resins, for example, such as "AFP-B" commercially available from Orient Chemical Industries Co., Ltd., and the like; imidazole derivatives, for example, such as "PLZ-2001" and "PLZ-8001" both commercially available from Shikoku Chemicals Corporation, and the like; and styrene-acrylic resins, for example, such as "FCA-701PT" commercially available from Fujikura Kasei Co., Ltd., and the like.

Examples of the charge control agent for negative charging include metal-containing azo dyes, for example, such as "VALIFAST (registered trademark) BLACK 3804", "BONTRON (registered trademark) S-31", "BONTRON (registered trademark) S-32", "BONTRON (registered trademark) S-34" and "BONTRON (registered trademark) S-36" all commercially available from Orient Chemical Industries Co., Ltd., "AIZEN SPILON BLACK TRI" and "T-77" both commercially available from Hodogaya Chemical Co., Ltd., and the like; metal compounds of benzylic acid compounds, for example, such as "LR-147" and "LR-297" both commercially available from Japan Carlit Co., Ltd., and the like; metal compounds of salicylic acid compounds, for example, such as "BONTRON (registered trademark) E-81", "BONTRON (registered trademark) E-84", "BONTRON (registered trademark) E-88" and "BONTRON E-304" all commercially available from Orient Chemical Industries Co., Ltd., "TN-105" commercially available from Hodogaya Chemical Co., Ltd., and the like; copper phthalocyanine dyes; quaternary ammonium salts, for example, such as "COPY CHARGE PX VP434" commercially available from Clariant AG, nitroimidazole derivatives, and the like; and organometallic compounds, and the like. These charge control agents may be used alone or in combination of any two or more thereof.

The content of the charge control agent in the toner is preferably not less than 0.01 part by mass, more preferably not less than 0.2 part by mass and even more preferably not less than 0.5 part by mass, and is also preferably not more than 10 parts by mass, more preferably not more than 5 parts by mass, even more preferably not more than 3 parts by mass and further even more preferably not more than 2 parts by mass, on the basis of 100 parts by mass of a whole amount of the resin components contained in the toner.

<Other Additives>

The toner particles may appropriately further contain the other additives such as a magnetic powder, a flow modifier, a conductivity modifier, a reinforcing filler such as fibrous materials, an antioxidant, an anti-aging agent, a cleanability improver, etc.

The content of the toner particles in the toner of the present invention preferably not less than 80% by mass, more preferably not less than 90% by mass and even more preferably not less than 95% by mass, and is also not more than 100% by mass and preferably not more than 99% by mass.

The volume-median particle size ($D_{50}$) of the toner particles is preferably not less than 2 μm, more preferably not less than 3 μm and even more preferably not less than 4 μm, and is also preferably not more than 20 μm, more preferably not more than 15 μm and even more preferably not more than 10 μm. Incidentally, in the present specification, the volume-median particle size ($D_{50}$) as used herein means a particle size at which a cumulative volume frequency calculated on the basis of a volume fraction of particles from a smaller particle size side thereof is 50%.

<External Additives>

The toner of the present invention may further contain external additives in order to improve a flowability of the toner. Examples of the external additives include fine particles of inorganic materials such as silica, alumina, titania, zirconia, tin oxide, zinc oxide, etc., and organic fine particles, e.g., resin particles, etc., such as melamine-based resin fine particles, polytetrafluoroethylene resin fine particles, etc. These external additives may be used alone or in combination of any two or more thereof. Among these external additives, preferred is silica, and more preferred is a hydrophobic silica formed by treating silica with a hydrophobic treatment agent.

Examples of the hydrophobic treatment agent include hexamethyl disilazane (HMDS), dimethyldichlorosilane (DMDS), silicone oil, octyl triethoxysilane (OTES) and methyl triethoxysilane. Among these hydrophobic treatment agents, preferred is hexamethyl disilazane.

In the case where the toner particles are surface-treated with the external additives, the content of the external additives in the toner of the present invention is preferably not less than 0.05 part by mass, more preferably not less than 0.08 part by mass and even more preferably not less than 0.1 part by mass, and is also preferably not more than 5 parts by mass, more preferably not more than 3 parts by mass and even more preferably not more than 2 parts by mass, on the basis of 100 parts by mass of the toner particles, from the viewpoint of improving chargeability and flowability of the resulting toner.

[Process for Producing Toner]

The toner of the present invention may be produced by any conventionally known methods such as a melt-kneading method, an emulsification phase inversion method, a suspension polymerization method, an emulsification aggregation method, etc. However, from the viewpoint of enhancing productivity of the toner or improving dispersibility of the colorant therein, the toner is preferably produced in the form of a pulverized toner by the melt-kneading method.

In the present invention, the melt-kneading method means such a method in which the toner raw materials containing the colorant, the resin composition (P) and the resin composition (W) are melt-kneaded, and the obtained melt-kneaded material is then pulverized to produce the toner.

In the case where the toner produced is in the form of a pulverized toner, the process for producing the toner includes, for example:

Step 1: subjecting the acid group-containing amorphous polyester-based resin (A) and the amine compound to condensation reaction to obtain the resin composition (P);

Step 2: melt-kneading toner raw materials containing the resin composition (P) obtained in the step 1, the colorant and the resin composition (W); and Step 3: subjecting a melt-kneaded material obtained in the step 2 to pulverization and classification to obtain the toner particles.

In the step 2, the toner raw materials may also contain the other additives such as a charge control agent, etc. It is preferred that these toner raw materials are previously mixed with each other using a mixer such as a Henschel mixer, a ball mill, etc., and then the resulting mixture is fed to the kneader.

The temperature used upon the melt-kneading is preferably not lower than 80° C., more preferably not lower than 90° C. and even more preferably not lower than 95° C., and is also preferably not higher than 160° C. and more preferably not higher than 130° C., from the viewpoint of improving dispersibility of the colorant and the other additives such as a charge control agent, etc., in the resin binder, from the viewpoint of reducing a mechanical force applied upon the melt-kneading to suppress generation of heat, as well as from the viewpoint of enhancing productivity of the toner.

The residence time of the toner raw materials in the kneader upon the melt-kneading may vary depending upon the scale of the kneader and the amounts of the toner raw materials treated, and is preferably not less than 10 seconds, more preferably not less than 13 seconds and even more preferably not less than 15 seconds, and is also preferably not more than 30 minutes, more preferably not more than 10 minutes, even more preferably not more than 5 minutes, further even more preferably not more than 1 minute and still further even more preferably not more than 30 seconds. The average residence time means the time elapsed from feed of the toner raw materials to the kneader to discharge of the obtained melt-kneaded material therefrom.

The melt-kneading of the step 2 may be conducted using a conventionally known kneader such as a closed-type kneader, a single-screw extruder or a twin-screw extruder, an open roll-type kneader, etc. Of these kneaders, from the viewpoint of melt-kneading crystals, the twin-screw extruder that can be set to high-temperature conditions is preferably used, and a co-rotating twin-screw extruder whose screw axles can be rotated in the same direction is more preferably used.

The twin-screw extruder has a closed kneading section in which the respective materials are easily melted by a kneading heat generated upon the kneading.

The preset temperature of the twin-screw extruder undergoes no influence by melting properties of the respective materials owing to a structure of the extruder, so that the melt-kneading in the twin-screw extruder can be readily conducted at any intended temperature.

The preset temperature of the twin-screw extruder (preset temperature of a barrel thereof) is preferably controlled to the same temperature range as used in the aforementioned melt-kneading.

The rotating peripheral speed of the twin-screw extruder in the case where the extruder is a co-rotating twin-screw extruder is preferably not less than 5 m/min, more preferably not less than 10 m/min and even more preferably not less than 15 m/min, and is also preferably not more than 50 m/min, more preferably not more than 40 m/min and even more preferably not more than 30 m/min, from the viewpoint of improving dispersibility of the colorant and the other additives such as a charge control agent, etc., in the toner as well as from the viewpoint of reducing a mechanical force applied upon the melt-kneading to suppress generation of heat.

After cooling the melt-kneaded material obtained in the step 2 near to a temperature at which the material can be pulverized, the cooled melt-kneaded material is fed to the subsequent step 3.

The pulverization in the step 3 may be conducted in multiple stages. For example, the resin kneaded material obtained by curing the melt-kneaded material may be coarsely crushed into particles having a particle size of not less than 1 mm and not more than 5 mm, and then the obtained particles may be finely pulverized into a desired particle size.

Incidentally, in the step 3, as a crusher or mill used for the coarse crushing and fine pulverization as well as a classifier used for the classification, any suitable conventionally known devices may be appropriately selected and used. Examples of the crusher or mill suitably used for the coarse crushing include a hammer mill, an atomizer, a Rotoplex mill and the like. Examples of the crusher or mill suitably used for the fine pulverization include a fluidized bed jet mill, a collision plate jet mill, and a rotary mechanical mill. Of these crushers or mills for the fine pulverization, from the viewpoint of improving the pulverization efficiency, a fluidized bed jet mill and a collision plate jet mill are preferably used, and a collision plate jet mill is more preferably used.

Examples of the classifier used for the classification in the step 3 include an airflow classifier, an inertial classifier, a sieve classifier, and the like. The pulverized material that is to be removed upon the classification owing to poor pulverization thereof may be subjected again to the pulverization treatment, and the pulverization and classification treatments may be repeatedly conducted, if required.

The process for producing the toner according to the present invention may further include the step of mixing the resulting toner particles with the external additives.

The mixing of the toner particles and the external additives is preferably conducted using a mixer equipped with a stirrer such as a rotating blade, etc. As such a mixer, preferred is a high-speed mixer such as a Henschel mixer, a Super mixer, etc., and more preferred is a Henschel mixer.

The toner of the present invention may be used for developing latent images formed by an electrophotographic method, an electrostatic recording method, an electrostatic printing method, etc. The toner can be used as one-component system developer, or as a two-component system developer prepared by mixing the toner with a carrier.

With respect to the aforementioned embodiments, the present invention further provides the following aspects relating to the toner for development of electrostatic images, the process for producing the toner for development of electrostatic images, etc.

<1> A toner for development of electrostatic images, containing a colorant, a resin composition (P) and a resin composition (W), in which:

the resin composition (P) is a resin composition formed by subjecting an acid group-containing amorphous polyester-based resin (A) and an amine compound to condensation reaction; and the resin composition (W) is a resin composition formed by subjecting an alcohol component (W-al), a carboxylic acid component (W-ac) and a hydrocarbon wax containing at least one functional group selected from the group consisting of a hydroxy group and a carboxy group to condensation reaction.

<2> The toner for development of electrostatic images according to the above aspect <1>, wherein the resin (A) is a polycondensate of an alcohol component (A-al)

and a carboxylic acid component (A-ac), and the alcohol component (A-al) contains an alkyleneoxide adduct of bisphenol A (BPA-AO).

<3> The toner for development of electrostatic images according to the above aspect <2>, wherein a content of the BPA-AO in the alcohol component (A-al) is preferably not less than 80 mol %, more preferably not less than 90 mol %, even more preferably not less than 95 mol % and further even more preferably not less than 98 mol %, and is also not more than 100 mol %, and furthermore preferably 100 mol %.

<4> The toner for development of electrostatic images according to any one of the above aspects <1> to <3>, wherein a softening point of the resin (A) is preferably not lower than 80° C. more preferably not lower than 90° C. and even more preferably not lower than 95° C., and is also preferably not higher than 130° C., more preferably not higher than 120° C. and even more preferably not higher than 110° C.

<5> The toner for development of electrostatic images according to any one of the above aspects <1> to <4>, wherein the amine compound preferably contains at least one compound selected from the group consisting of a polyalkyleneimine containing an alkylene group having not less than 1 and not more than 5 carbon atoms, a polyallylamine, a (poly)ethylenepolyamine, an alkanolamine having not less than 2 and not more than 9 carbon atoms and an alkylamine having not less than 1 and not more than 6 carbon atoms; more preferably contains at least one compound selected from the group consisting of a polyalkyleneimine containing an alkylene group having not less than 1 and not more than 5 carbon atoms, a polyallylamine, a (poly) ethylenepolyamine and a tertiary alkanolamine having not less than 2 and not more than 9 carbon atoms; even more preferably contains at least one compound selected from the group consisting of a polyalkyleneimine containing an alkylene group having not less than 1 and not more than 5 carbon atoms, a polyallylamine and a tertiary alkanolamine having not less than 2 and not more than 9 carbon atoms; further even more preferably contains at least one compound selected from the group consisting of a polyalkyleneimine containing an alkylene group having not less than 1 and not more than 5 carbon atoms and a polyallylamine, still further even more preferably contains a polyalkyleneimine containing an alkylene group having not less than 1 and not more than 5 carbon atoms, and furthermore preferably contains the polyethyleneimine.

<6> The toner for development of electrostatic images according to the above aspect <5>, wherein in the case where the amine compound contains the polyalkyleneimine containing an alkylene group having not less than 1 and not more than 5 carbon atoms, a whole amount of the polyalkyleneimine containing an alkylene group having not less than 1 and not more than 5 carbon atoms which is contained in the amine compound is preferably not less than 70% by mass, more preferably not less than 80% by mass and even more preferably not less than 90% by mass, and is also not more than 100% by mass, and furthermore preferably 100% by mass.

<7> The toner for development of electrostatic images according to the above aspect <5> or <6>, wherein a number-average molecular weight of the polyalkyleneimine is preferably not less than 150, more preferably not less than 500, even more preferably not less than 800, further even more preferably not less than 1,000 and still further even more preferably not less than 2,000, and is also preferably not more than 10,000, more preferably not more than 5,000 and even more preferably not more than 4,000. <8> The toner for development of electrostatic images according to the above aspect <5>, wherein a weight-average molecular weight of the polyallylamine is preferably not less than 800, more preferably not less than 1,000 and even more preferably not less than 1,300, and is also preferably not more than 10,000, more preferably not more than 5,000, even more preferably not more than 4,000, further even more preferably not more than 3,000 and still further even more preferably not more than 2,000.

<9> The toner for development of electrostatic images according to any one of the above aspects <1> to <8>, wherein an amount of the amine compound used is preferably not less than 0.05 part by mass, more preferably not less than 0.1 part by mass and even more preferably not less than 0.5 part by mass, and is also preferably not more than 20 parts by mass, more preferably not more than 10 parts by mass, even more preferably not more than 7 parts by mass, further even more preferably not more than 5 parts by mass, still further even more preferably not more than 3 parts by mass and furthermore preferably not more than 2 parts by mass, on the basis of 100 parts by mass of the resin (A).

<10> The toner for development of electrostatic images according to any one of the above aspects <1> to <9>, wherein a softening point of the resin composition (P) is preferably not lower than 80° C., more preferably not lower than 90° C. and even more preferably not lower than 95° C., and is also preferably not higher than 130° C., more preferably not higher than 120° C. and even more preferably not higher than 110° C.

<11> The toner for development of electrostatic images according to any one of the above aspects <1> to <10>, wherein a content of the resin composition (P) in the toner as calculated in terms of a content of the resin composition (P) on the basis of a total amount of the resin components contained in the toner is preferably not less than 10% by mass, more preferably not less than 20% by mass and even more preferably not less than 30% by mass, and is also preferably not more than 60% by mass, more preferably not more than 50% by mass and even more preferably not more than 40% by mass.

<12> The toner for development of electrostatic images according to any one of the above aspects <1> to <11>, wherein the hydrocarbon wax containing at least one functional group selected from the group consisting of a hydroxy group and a carboxy group is preferably a hydrocarbon wax having a hydroxy value based on a hydroxy group thereof which is identical to or higher than an acid value based on a carboxy group thereof, more preferably a hydrocarbon wax having a hydroxy value based on a hydroxy group thereof which is higher than an acid value based on a carboxy group thereof, even more preferably a hydrocarbon wax containing a hydroxy group, and further even more preferably a hydrocarbon wax containing a hydroxy group only.

<13> The toner for development of electrostatic images according to any one of the above aspects <1> to <12>, wherein an amount of the hydrocarbon wax containing at least one functional group selected from the group consisting of a hydroxy group and a carboxy group on the basis of 100 parts by mass of a theoretical yield of a polyester obtained from the alcohol component (W-al) and the carboxylic acid component (W-ac) is preferably not less than 1 part by mass, more preferably not less than 2 parts by mass and even more preferably not less than 4 parts by mass, and is also preferably not more than 10 parts by mass and more preferably not more than 7 parts by mass.

<14> The toner for development of electrostatic images according to any one of the above aspects <1> to <13>, wherein a softening point of the resin composition (W) is preferably not lower than 80° C., more preferably not lower than 85° C. and even more preferably not lower than 90° C., and is also preferably not higher than 130° C., more preferably not higher than 120° C. and even more preferably not higher than 110° C.

<15> The toner for development of electrostatic images according to any one of the above aspects <1> to <14>, wherein a content of the resin composition (W) in the toner as calculated in terms of a content of the resin composition (W) on the basis of a total amount of the resin components contained in the toner is preferably not less than 10% by mass, more preferably not less than 20% by mass and even more preferably not less than 25% by mass, and is also preferably not more than 60% by mass, more preferably not more than 50% by mass, even more preferably not more than 40% by mass and further even more preferably not more than 35% by mass.

<16> The toner for development of electrostatic images according to any one of the above aspects <1> to <15>, wherein a total content of the resin composition (P) and the resin composition (W) in the toner as calculated in terms of a total content of these resin compositions on the basis of a total amount of the resin components contained in the toner is preferably not less than 40% by mass, more preferably not less than 50% by mass and even more preferably not less than 60% by mass, and is also preferably not more than 90% by mass, more preferably not more than 80% by mass and even more preferably not more than 70% by mass.

<17> The toner for development of electrostatic images according to any one of the above aspects <1> to <16>, wherein a mass ratio of the content of the resin composition (P) to the content of the resin composition (W) [resin composition (P)/resin composition (W)] in the toner is preferably not less than 0.3, more preferably not less than 0.5, even more preferably not less than 1 and further even more preferably not less than 1.1, and is also preferably not more than 3, more preferably not more than 2, even more preferably not more than 1.5 and further even more preferably not more than 1.3.

<18> The toner for development of electrostatic images according to any one of the above aspects <1> to <17>, wherein the toner further contains an amorphous polyester-based resin (B) which is preferably a resin having a softening point that is different from that of the resin (A) and more preferably a resin having a softening point higher than that of the resin (A).

<19> The toner for development of electrostatic images according to the above aspect <18>, wherein the resin (B) is preferably an amorphous polyester resin as a polycondensate of an alcohol component (B-al) and a carboxylic acid component (B-ac).

<20> The toner for development of electrostatic images according to the above aspect <18> or <19>, wherein in the case where the softening point of the resin (A) is not lower than 80° C. and not higher than 120° C., the softening point of the resin (B) is preferably higher than 120° C., more preferably not lower than 125° C. and even more preferably not lower than 130° C., and is also preferably not higher than 170° C., more preferably not higher than 150° C. and even more preferably not higher than 140° C.

<21> The toner for development of electrostatic images according to any one of the above aspects <18> to <20>, wherein a content of the resin (B) in the toner as calculated in terms of a content of the resin (B) on the basis of a total amount of the resin components contained in the toner is preferably not less than 10% by mass, more preferably not less than 20% by mass and even more preferably not less than 30% by mass, and is also preferably not more than 60% by mass, more preferably not more than 50% by mass and even more preferably not more than 40% by mass.

<22> The toner for development of electrostatic images according to any one of the above aspects <1> to <21>, wherein a content of the colorant in the toner is preferably not less than 1 part by mass, more preferably not less than 2 parts by mass, even more preferably not less than 3 parts by mass, further even more preferably not less than 5 parts by mass, still further even more preferably not less than 7 parts by mass, furthermore preferably not less than 10 parts by mass and even furthermore preferably more than 10 parts by mass, and is also preferably not more than 40 parts by mass, more preferably not more than 30 parts by mass and even more preferably not more than 15 parts by mass, on the basis of 100 parts by mass of a whole amount of the resin components contained in the toner.

<23> The toner for development of electrostatic images according to any one of the above aspects <1> to <22>, wherein the toner is in the form of a pulverized toner produced by a melt-kneading method.

<24> A use of the toner according to any one of the above aspects <1> to <23> as one-component system developer, or as a two-component system developer prepared by mixing the toner with a carrier.

<25> A process for producing a toner for development of electrostatic images, including:

Step 1: subjecting an acid group-containing amorphous polyester-based resin (A) and an amine compound to condensation reaction to obtain a resin composition (P); and Step 2: melt-kneading toner raw materials containing the resin composition (P) obtained in the step 1, a colorant and a resin composition (W), in which the resin composition (W) is a resin composition formed by subjecting an alcohol component (W-al), a carboxylic acid component (W-ac) and a hydrocarbon wax containing at least one functional group selected from the group consisting of a hydroxy group and a carboxy group to condensation reaction.

<26> The process for producing a toner for development of electrostatic images according to the above aspect <25>, further including:

Step 3: subjecting a melt-kneaded material obtained in the step 2 to pulverization and classification treatments to obtain toner particles.

<27> A toner for development of electrostatic images, containing a colorant, a resin composition (P) and a resin composition (W), in which:

the resin composition (P) is a resin composition formed by subjecting an acid group-containing amorphous polyester-based resin (A) and an amine compound to condensation reaction, the amorphous polyester-based resin (A) being a polycondensate of an alcohol component (A-al) containing an alkyleneoxide adduct of bisphenol A and a carboxylic acid component (A-ac), and the amine compound containing at least one compound selected from the group consisting of a polyalkyleneimine containing an alkylene group having not less than 1 and not more than 5 carbon atoms, and a polyallylamine; and the resin composition (W) is a resin composition formed by subjecting an alcohol component (W-al), a carboxylic acid component (W-ac) and a hydroxy group-containing hydrocarbon wax to condensation reaction.

EXAMPLES

Respective properties of the raw materials, etc., were measured and evaluated by the following methods.

[Measurement]

[Acid Value and Hydroxy Value of Resin or Resin Composition]

The acid value and the hydroxy value of the resin were measured by the method as prescribed in JIS K 0070: 1992 except that only a mixed solvent of ethanol and ether used as a measuring solvent in the method was replaced with a mixed solvent containing acetone and toluene at a volume ratio [acetone:toluene] of 1:1 in the case where the resin was an amorphous polyester-based resin, or with chloroform in the case where the resin was a crystalline polyester resin.

[Number-Average Molecular Weight and Weight-Average Molecular Weight of Resin]

The number-average molecular weight and the weight-average molecular weight of the resin were determined from molecular weight distribution thereof measured by the following gel permeation chromatography (GPC).

(1) Preparation of Sample Solution

A sample to be measured was dissolved in tetrahydrofuran (in the case where the sample was an amorphous polyester-based resin) or chloroform (in the case where the sample was a crystalline polyester resin) at 25° C. so as to prepare a solution having a concentration of 0.5 g/100 mL. Then, the resulting solution was filtered through a fluororesin filter "DISMIC-25JP" having a pore size of 0.2 μm available from Advantec Co., Ltd., to remove insoluble components therefrom, thereby preparing a sample solution.

(2) Measurement of Molecular Weights

Using the below-mentioned measuring apparatus and analyzing columns, tetrahydrofuran (in the case where the sample was an amorphous polyester-based resin) or chloroform (in the case where the sample was a crystalline polyester resin) as an eluent was allowed to flow through the columns at a flow rate of 1 mL/minute, and the columns were stabilized in a thermostatic chamber at 40° C., followed by injecting 100 μL of the sample solution into the columns to measure molecular weights of the sample. The molecular weight of the sample was calculated on the basis of a calibration curve previously prepared. At this time, the calibration curve was prepared by using several kinds of monodisperse polystyrenes "A-500" ($5.0\times10^2$), "A-1000" ($1.01\times10^3$), "A-2500" ($2.63\times10^3$), "A-5000" ($5.97\times10^3$), "F-1" ($1.02\times10^4$). "F-2" ($1.81\times10^4$). "F-4" ($3.97\times10^4$). "F-10" ($9.64\times10^4$). "F-20" ($1.90\times10^5$), "F-40" ($4.27\times10^5$), "F-80" ($7.06\times10^5$) and "F-128" ($1.09\times10^6$) all available from Tosoh Corporation, as reference standard samples. The numerical values in the aforementioned parentheses represent molecular weights of the respective reference standard samples.

Measuring Apparatus: "HLC-8220CPC" available from Tosoh Corporation

Analyzing Columns: "GMHXL"+"G3000HXL" both available from Tosoh Corporation

[Softening Point of Resin or Resin Composition]

Using a flow tester "CFT-500D" available from Shimadzu Corporation, 1 g of a sample to be measured was extruded through a nozzle having a die pore diameter of 1 mm and a length of 1 mm while heating the sample at a temperature rise rate of 6° C./minute and applying a load of 1.96 MPa thereto by a plunger. The softening point of the sample was determined as the temperature at which a half amount of the sample was flowed out when plotting a downward movement of the plunger of the flow tester relative to the temperature.

[Glass Transition Temperature of Resin or Resin Composition]

Using a differential scanning calorimeter "Q-20" available from TA Instruments Japan Inc., a sample was weighed in an amount of 0.01 to 0.02 g in an aluminum pan, heated to 200° C. and then cooled from 200° C. to 0° C. at a temperature drop rate of 10° C./minute, and then the sample was further heated at a temperature rise rate of 10° C./minute to prepare an endotherm curve of the sample. The temperature at which an extension of the baseline below the endothermic maximum peak temperature as observed in the thus prepared curve was intersected with a tangential line having a maximum inclination in the region from a rise-up portion to an apex of the peak was read as a glass transition temperature of the sample.

[Endothermic Maximum Peak Temperature]

Using a differential scanning calorimeter "Q-20" available from TA Instruments Japan Inc., a sample was cooled from room temperature (20° C.) to 0° C. at a temperature drop rate of 10° C./minute, and then allowed to stand at 0° C. for 1 minute. Thereafter, the sample was heated to 180° C. at a temperature rise rate of 10° C./minute to measure an endothermic heat amount thereof. Among the endothermic peaks observed in the thus measured characteristic curve, the temperature of the peak having a largest peak area was regarded as an endothermic maximum peak temperature of the sample.

[Number-Average Molecular Weight (Mn) of Polyalkyleneimine and Weight-Average Molecular Weight (Mw) of Polyallylamine]

The number-average molecular weight and the weight-average molecular weight were determined from molecular weight distribution measured by the following gel permeation chromatography (GPC).

(1) Preparation of Sample Solution

The polyalkyleneimine or polyallylamine was dissolved in a solution prepared by dissolving 0.15 mol/L of $Na_2SO_4$ in a 1% by mass acetic acid aqueous solution to prepare a solution having a concentration of 0.2 g/100 mL.

Then, the resulting solution was filtered through a fluororesin filter "FP-200" having a pore size of 0.2 μm available from Sumitomo Electric Industries, Co., Ltd., to remove insoluble components therefrom, thereby preparing a sample solution.

(2) Measurement of Molecular Weight

Using the below-mentioned measuring apparatus and analyzing columns, the solution prepared by dissolving 0.15 mol/L of $Na_2SO_4$ in a 1% by mass acetic acid aqueous solution as an eluent was allowed to flow through the columns at a flow rate of 1 mL/minute, and the columns were stabilized in a thermostatic chamber at 40° C., followed by injecting 100 μL of the sample solution into the columns to measure a molecular weight of the sample. The molecular weight of the sample was calculated on the basis of a calibration curve previously prepared. At this time, the calibration curve was prepared by using several kinds of standard pullulans "P-5" ($5.9\times10^3$, "P-50" ($4.73\times10^4$), "P-200" ($2.12\times10^5$) and "P-800" ($7.08\times10^5$) all available from SHOWA DENKO K.K. as reference standard samples. The numerical values in the aforementioned parentheses represent molecular weights of the respective reference standard samples.

Measuring Apparatus: "HLC-8320GPC" available from Tosoh Corporation

Analyzing Columns: "α"+"α-M"+"α-M" all available from Tosoh Corporation

[Melting Point of Releasing Agent]

Using a differential scanning calorimeter "Q-100" available from TA Instruments Japan Inc., 0.02 g of a sample was weighed in an aluminum pan, heated to 200° C. and then cooled from 200° C. to 0° C. at a temperature drop rate of 10° C./minute, and then the sample was further heated at a temperature rise rate of 10° C./min to measure an endothermic heat amount thereof. The endothermic maximum peak temperature observed in the thus measured characteristic curve was regarded as a melting point of the sample.

[Volume-Median Particle Size ($D_{50}$) of Toner Particles]

The volume-median particle size ($D_5$) of the toner particles were measured as follows.

Measuring Apparatus: "Coulter Multisizer (registered trademark) III" available from Beckman Coulter Inc.

Aperture Diameter: 50 μm

Analyzing Software: "Coulter Multisizer (registered trademark) III Ver. 3.51" available from Beckman Coulter Inc.

Electrolyte Solution: "Isotone (registered trademark) II" available from Beckman Coulter Inc.

Dispersion Liquid: The dispersion liquid was prepared by dissolving "EMULGEN (registered trademark) 109P" (polyoxyethylene lauryl ether; HLB (Hydrophile-Lipophile Balance by Griffin method): 13.6) available from Kao Corporation in the above electrolyte solution such that the concentration of "EMULGEN 109P" in the obtained dispersion liquid was controlled to 5% by mass.

Dispersing Conditions: Ten milligrams of a sample to be measured were added to 5 mL of the aforementioned dispersion liquid, and the obtained mixture was dispersed using an ultrasonic disperser for 1 minute. Thereafter, 25 mL of the aforementioned electrolyte solution was added to the resulting dispersion, and the obtained mixture was further dispersed using the ultrasonic disperser for 1 minute to prepare a sample dispersion liquid.

Measuring Conditions: The thus prepared sample dispersion liquid was added to 100 mL of the aforementioned electrolyte solution in a beaker such that a concentration of the resultant dispersion was adjusted to the concentration permitting the measurement for particle sizes of 30000 particles within 20 seconds. And then, the particle sizes of 30000 particles in the resulting dispersion were measured under the aforementioned conditions, and a volume-median particle size ($D_{50}$) of the particles was determined from the thus measured particle size distribution.

[Production of Resin (A), Resin (B) and Resin Composition (W)]

Production Examples A1, W1 and W2 [Production of Resin A-1 and Resin Compositions W-1 and W-2]

A 20 L four-necked flask equipped with a thermometer, a stainless steel stirring bar, a flow-down type condenser and a nitrogen inlet tube was charged with the raw material monomers and the esterification catalyst as shown in Tables 1 and 2 (in Production Examples W1 and W2, further charged with the hydroxy group-containing hydrocarbon wax as shown in Table 2). The contents of the flask were heated to 235° C. within a mantle heater in a nitrogen atmosphere over 2 hours. Thereafter, after confirming that the reaction rate of the raw material monomers reached 90% or more as measured at 235° C., the contents of the flask were further reacted with each other at 235° C. under a reduced pressure of 40 kPa until a softening point of the resulting product reached a desired value, thereby obtaining a resin A-1 and resin compositions W-1 and W-2. Various properties of the thus obtained resin and resin compositions were measured and shown in Tables 1 and 2.

Production Example B1 [Production of Resin B-1]

A 20 L four-necked flask equipped with a thermometer, a stainless steel stirring bar, a flow-down type condenser and a nitrogen inlet tube was charged with the monomers other than adipic acid and trimellitic anhydride among the raw material monomers shown in Table 1, and the esterification catalyst. The contents of the flask were heated to 235° C. within a mantle heater in a nitrogen atmosphere over 2 hours. Thereafter, after confirming that the reaction rate of the monomers reached 90% or more as measured at 235° C., the contents of the flask were cooled to 190° C., and then adipic acid and trimellitic anhydride as shown in Table 1 were added thereto, followed by heating the contents of the flask to 210° C. over 2 hours. Thereafter, after allowing the contents of the flask to react with each other at 210° C. for 1 hour, the contents of the flask were further reacted with each other under a reduced pressure of 40 kPa until a softening point of the resulting product reached a desired value, thereby obtaining an amorphous polyester resin B-1. Various properties of the thus obtained amorphous polyester resin B-1 were measured and shown in Table 1.

TABLE 1

| | | | Production Examples A1 Resins A-1 Ratio*2 | Amount charged (g) | Production Examples B1 Resins B-1 Ratio*2 | Amount charged (g) |
|---|---|---|---|---|---|---|
| Raw material monomers | Alcohol component | BPA-PO*1 | 100 | 7000 | 100 | 7000 |
| | Carboxylic acid component | Terephthalic acid | 81 | 2689 | 37 | 1228 |
| | | Adipic acid | 0 | 0 | 33 | 949 |
| | | Trimellitic anhydride | 0 | 0 | 19 | 730 |
| | | | Part(s) by mass*3 | Amount charged (g) | Part(s) by mass*3 | Amount charged (g) |
| Esterification catalyst | Tin (II) dioctylate | | 0.5 | 48.4 | 0.5 | 49.5 |
| Properties | Acid value [mgKOH/g] | | 6.1 | | 17.6 | |
| | Weight-average molecular weight | | 4560 | | 5390 | |
| | Softening point [° C.] | | 98.6 | | 137.0 | |
| | Glass transition temperature [° C.] | | 57.7 | | 55.4 | |
| | Crystallinity index | | 1.7 | | 1.8 | |

Note:

*1BPA-PO: Propyleneoxide (2.1) adduct of bisphenol A.

*2Molar ratio on the basis of 100 mol of a whole amount of an alcohol component in raw material monomers.

*3Amount (part(s) by mass) on the basis of 100 parts by mass of a total amount of an alcohol component and a carboxylic acid component in raw material monomers.

TABLE 2

| | | | Production Examples W1 Resin compositions W-1 Ratio*3 | Amount charged (g) | Production Examples W2 Resin compositions W-2 Ratio*3 | Amount charged (g) |
|---|---|---|---|---|---|---|
| Raw material monomers | Alcohol component | BPA-PO*1 | 100 | 7000 | 100 | 7000 |
| | Carboxylic acid component | Terephthalic acid | 81 | 2689 | 81 | 2689 |
| | | | Part(s) by mass*4 | Amount charged (g) | Part(s) by mass*4 | Amount charged (g) |
| Hydroxy group containing hydrocarbon wax*2 | | | 5 | 482 | 3 | 283 |
| | | | Part(s) by mass*5 | Amount charged (g) | Part(s) by mass*5 | Amount charged (g) |
| Esterification catalyst | Tin (II) dioctylate | | 0.5 | 50.9 | 0.5 | 49.9 |
| Properties | Acid value [mgKOH/g] | | 2.3 | | 4.2 | |
| | Softening point [° C.] | | 93.2 | | 95.2 | |
| | Glass transition temperature [° C.] | | 50.7 | | 53.5 | |
| | Crystallinity index | | 1.8 | | 1.8 | |

Note:

*1BPA-PO: Propyleneoxide (2.1) adduct of bisphenol A.

*2Hydrocarbon wax "Paracohol 6490" available from Nippon Seiro Co., Ltd.

*3Molar ratio on the basis of 100 mol of a whole amount of an alcohol component in raw material monomers.

*4Amount (part(s) by mass) on the basis of 100 parts by mass of a theoretical yield of a polyester obtained from an alcohol component and a carboxylic acid component in raw material monomers.

*5Amount (part(s) by mass) on the basis of 100 parts by mass of a total amount of an alcohol component and a carboxylic acid component in raw material monomers.

[Production of Resin Composition (P)]

Production Examples P1 to P8 (Production of Resin Compositions P-1 to P-8)

The raw materials shown in Table 3 were charged into a 20 L four-necked flask equipped with a thermometer, a stainless steel stirring bar, a flow-down type condenser and a nitrogen inlet tube, and the contents of the flask were heated to 150° C. within a mantle heater in a nitrogen atmosphere over 2 hours. Thereafter, the contents of the flask were reacted with each other at 150° C. for 3 hours, thereby obtaining resin compositions P-1 to P-8. Various properties of the thus obtained resin compositions were measured and shown in Table 3.

TABLE 3-1

| | | Production Examples | | | | | | | |
|---|---|---|---|---|---|---|---|---|---|
| | | P1 | | P2 | | P3 | | P4 | |
| | | Resin compositions | | | | | | | |
| | | P-1 | | P-2 | | P-3 | | P-4 | |
| | | Ratio*[1] | Amount charged (g) | Ratio*[1] | Amount charged (g) | Ratio*[1] | Amount charged (g) | Ratio*[1] | Amount charged (g) |
| Amorphous polyester resin | Resin A-1 | 100 | 9000 | 100 | 9000 | 100 | 9000 | 100 | 9000 |
| Amine compound | PEI-1*[2] | 1 | 90 | 5 | 450 | 0 | 0 | 0 | 0 |
| | PEI-2*[2] | 0 | 0 | 0 | 0 | 1 | 90 | 0 | 0 |
| | PAA-1*[2] | 0 | 0 | 0 | 0 | 0 | 0 | 1 | 90 |
| | Diethylenetriamine | 0 | 0 | 0 | 0 | 0 | 0 | 0 | 0 |
| | Triethylenetetramine | 0 | 0 | 0 | 0 | 0 | 0 | 0 | 0 |
| | Tetraethylenepentamine | 0 | 0 | 0 | 0 | 0 | 0 | 0 | 0 |
| | N,N-dimethylethanolamine | 0 | 0 | 0 | 0 | 0 | 0 | 0 | 0 |
| Properties | Softening point [° C.] | 102.1 | | 101.6 | | 102.3 | | 101.9 | |
| | Glass transition temperature [° C.] | 58.8 | | 58.2 | | 59.0 | | 58.5 | |
| | Crystallinity index | 1.7 | | 1.7 | | 1.7 | | 1.7 | |

Note:
*[1]Amount (part(s) by mass) on the basis of 100 parts by mass of a total amount of resins.
*[2]PEI-1 (polyethyleneimine; Mn: 3000).
PEI-2 (polyethyleneimine; Mn: 1500).
PAA-1 (polyallylamine "PAA-01" available from Nittobo Medical Co., Ltd.; Mw: 1600 (catalogue value)).

35

TABLE 3-2

| | | Production Examples | | | | | | | |
|---|---|---|---|---|---|---|---|---|---|
| | | P5 | | P6 | | P7 | | P8 | |
| | | Resin compositions | | | | | | | |
| | | P-5 | | P-6 | | P-7 | | P-8 | |
| | | Ratio*[1] | Amount charged (g) | Ratio*[1] | Amount charged (g) | Ratio*[1] | Amount charged (g) | Ratio*[1] | Amount charged (g) |
| Amorphous polyester resin | Resin A-1 | 100 | 9000 | 100 | 9000 | 100 | 9000 | 100 | 9000 |
| Amine compound | PEI-1*[2] | 0 | 0 | 0 | 0 | 0 | 0 | 0 | 0 |
| | PEI-2*[2] | 0 | 0 | 0 | 0 | 0 | 0 | 0 | 0 |
| | PAA-1*[2] | 0 | 0 | 0 | 0 | 0 | 0 | 0 | 0 |
| | Diethylenetriamine | 1 | 90 | 0 | 0 | 0 | 0 | 0 | 0 |
| | Triethylenetetramine | 0 | 0 | 1 | 90 | 0 | 0 | 0 | 0 |
| | Tetraethylenepentamine | 0 | 0 | 0 | 0 | 1 | 90 | 0 | 0 |
| | N,N-dimethylethanolamine | 0 | 0 | 0 | 0 | 0 | 0 | 1 | 90 |
| Properties | Softening point [° C.] | 101.8 | | 101.4 | | 102.4 | | 102.1 | |
| | Glass transition temperature [° C.] | 58.3 | | 58.2 | | 58.9 | | 59.0 | |
| | Crystallinity index | 1.7 | | 1.7 | | 1.7 | | 1.7 | |

Note:
*[1]Amount (part(s) by mass) on the basis of 100 parts by mass of a total amount of resins.
*[2]PEI-1 (polyethyleneimine; Mn: 3000).
PEI-2 (polyethyleneimine; Mn: 1500).
PAA-1 (polyallylamine "PAA-01" available from Nittobo Medical Co., Ltd.; Mw: 1600 (catalogue value)).

[Production of Toner]

Examples 1 to 9 and Comparative Examples 1 and 2 (Toners 1 to 9 and Toners 51 and 52)

One hundred parts by mass of a total amount of resin components having compounding ratios as shown in Table 4, 1 part by mass of a charge control agent for negative charging "BONTRON E-81" available from Orient Chemical Industries Co., Ltd., 12 parts by mass of a colorant "Cyanine Blue 4927" (C.I. Pigment Blue 15:3) available from Dainichiseika Color & Chemicals Mfg. Co., Ltd., and 2 parts by mass of a releasing agent "HNP-9" (paraffin wax; melting point: 80° C.) available from Nippon Seiro Co., Ltd., were sufficiently mixed with each other in a Henschel mixer, and then the obtained mixture was melted and kneaded using a co-rotating twin screw extruder having a overall length of a kneading portion of 1560 mm, a screw diameter of 42 mm and a barrel inner diameter of 43 mm at a screw rotating speed of 200 r/min and a barrel preset temperature of 100° C. The feed speed of the mixture was 20 kg/h, and the average residence time of the mixture was about 18 seconds. The resulting melt-kneaded material was cooled and coarsely crushed, and then finely pulverized by a jet mill and classified, thereby obtaining toner particles having a volume median particle size ($D_{50}$) of 8 μm.

One part by mass of a hydrophobic silica "AEROSIL NAX 50" (hydrophobic treatment agent: HMDS; average particle size: about 30 nm) available from Nippon Aerosil Co., Ltd., as an external additive was added to 100 parts by mass of the thus obtained toner particles, and the resulting mixture was mixed by a Henschel mixer, thereby obtaining toners 1 to 9 and toners 51 and 52.

[Evaluation of Toner]

[Image Density]

A solid image was outputted and printed on a wood-free paper "J-Paper A4 size" available from Fuji Xerox Co., Ltd., using a commercially available printer "Microline (registered tradename) 5400" available from Old Data Corporation such that an amount of the toner deposited on the paper was from 0.42 to 0.48 mg/cm$^2$, thereby obtaining a printed sheet of paper.

Next, the toner deposited on the paper was fused by passing the paper through a fuser whose temperature was adjusted to 130° C. at a fusing rate of 1.5 seconds per one sheet in a longitudinal direction of the A4-size paper, thereby obtaining a printed material.

A reflection image density of the fused image portion of the thus outputted printed material was measured using a colorimeter "SpectroEye" available from GretagMacbeth LLC under the light irradiating conditions including a standard light source D50, an observation visual field of 2°, and a density standard DINNB based on an absolute white color. The larger the value of the reflection image density becomes, the more excellent the image density is. The results are shown in Table 4.

[Chroma]

The a* value and the b* value of the fused image portion of the printed material outputted by the same method as used for the aforementioned evaluation for "Image Density" were measured using a colorimeter "SpectroEye" available from GretagMacbeth LLC under the light irradiating conditions including a standard light source D50, an observation visual field of 2°, and a density standard DINNB based on an absolute white color. A chroma C* of the fused image portion was calculated from the thus measured a* value and b* value according to the following formula. The larger the value of the chroma C* becomes, the more excellent the chroma of the toner is. The results are shown in Table 4.

$$C^*=[(a^*)^2+(b^*)^2]^{0.5}$$

TABLE 4

| | | Resin components | | | | | | | | Evaluation | |
|---|---|---|---|---|---|---|---|---|---|---|---|
| | | Resin composition (P) | | Resin composition (W) | | Amorphous polyester resin | | Colorant | | | |
| | Toner | Kind | Amount (part(s) by mass) | Kind | Amount (part(s) by mass) | Kind | Amount (part(s) by mass) | Kind*1 | Amount (part(s) by mass) | Reflection image density | Chroma (C*) |
| Example 1 | 1 | P-1 | 35 | W-1 | 30 | B-1 | 35 | PB 15:3 | 12 | 1.34 | 61 |
| Example 2 | 2 | P-2 | 35 | W-1 | 30 | B-1 | 35 | PB 15:3 | 12 | 1.26 | 60 |
| Example 3 | 3 | P-3 | 35 | W-1 | 30 | B-1 | 35 | PB 15:3 | 12 | 1.20 | 51 |
| Example 4 | 4 | P-4 | 35 | W-1 | 30 | B-1 | 35 | PB 15:3 | 12 | 1.30 | 59 |
| Example 5 | 5 | P-5 | 35 | W-1 | 30 | B-1 | 35 | PB 15:3 | 12 | 1.23 | 54 |
| Example 6 | 6 | P-6 | 35 | W-1 | 30 | B-1 | 35 | PB 15:3 | 12 | 1.21 | 59 |
| Example 7 | 7 | P-7 | 35 | W-1 | 30 | B-1 | 35 | PB 15:3 | 12 | 1.27 | 53 |
| Example 8 | 8 | P-8 | 35 | W-1 | 30 | B-1 | 35 | PB 15:3 | 12 | 1.28 | 56 |
| Example 9 | 9 | P-1 | 35 | W-2 | 30 | B-1 | 35 | PB 15:3 | 12 | 1.18 | 49 |
| Comparative Example 1 | 51 | (A-1) | 65 | — | — | B-1 | 35 | PB 15:3 | 12 | 0.96 | 43 |
| Comparative Example 2 | 52 | (A-1) | 35 | W-1 | 30 | B-1 | 35 | PB 15:3 | 12 | 1.03 | 45 |

Note:

*1PB 15:3: "Cyanine Blue 4927" (C.I. Pigment Blue 15:3) available from Dainichiseika Color & Chemicals Mfg. Co., Ltd.

As shown in Table 4, it was confirmed that the toners obtained in the Examples which contained the specific resin compositions were excellent in image density and chroma as compared to the toners obtained in the Comparative Examples.

Incidentally, as recognized from the comparison between Example 1 and Example 9, the resin composition (W-1) used in Example 1 contained a larger amount of the hydrocarbon wax introduced therein than that of the resin composition (W-2) used in Example 9. Thus, in Example 1, since the wettability of the resin composition (W) to the colorant was improved, the colorant was improved in dispersibility in the toner. Therefore, it was confirmed that the toner obtained in Example 1 was more excellent in image density and chroma than the toner obtained in Example 9.

The invention claimed is:

1. A toner for development of electrostatic images, comprising:

a colorant;

a resin composition (P);

a resin composition (W); and an amorphous polyester-based resin (B), wherein:

the resin composition (P) is a resin composition formed by subjecting an acid group-containing amorphous polyester-based resin (A) and an amine compound to a condensation reaction, the resin composition (W) is a resin composition formed by subjecting an alcohol component (W-al), a carboxylic acid component (W-ac), and a hydrocarbon wax comprising at least one functional group selected from the group consisting of a hydroxy group and a carboxy group to a condensation reaction, and the amorphous polyester-based resin (B) has a softening point that is higher than 120° C. and not higher than 170° C.

2. The toner for development of electrostatic images according to claim 1, wherein the amine compound comprises at least one compound selected from the group consisting of a polyalkyleneimine comprising an alkylene group comprising not less than 1 and not more than 5 carbon atoms, a polyallylamine, a (poly)ethylenepolyamine, and a tertiary alkanolamine comprising not less than 2 and not more than 9 carbon atoms.

3. The toner for development of electrostatic images according to claim 1, wherein the amine compound comprises a polyalkyleneimine comprising an alkylene group comprising not less than 1 and not more than 5 carbon atoms.

4. The toner for development of electrostatic images according to claim 1, wherein the amorphous polyester-based resin (A) is a polycondensate of an alcohol component (A-al) and a carboxylic acid component (A-ac), and the alcohol component (A-al) comprises an alkyleneoxide adduct of bisphenol A.

5. The toner for development of electrostatic images according to claim 1, wherein the hydrocarbon wax is the hydrocarbon wax comprising a hydroxy group.

6. The toner for development of electrostatic images according to claim 1, wherein a softening point of the amorphous polyester-based resin (A) is not lower than 80° C. and not higher than 120° C.

7. The toner for development of electrostatic images according to claim 1, wherein the toner for development of electrostatic images is a pulverized toner produced by a melt-kneading method.

8. The toner for development of electrostatic images according to claim 1, wherein a content of the resin composition (P) in the toner is not less than 10% by mass and not more than 60% by mass, wherein the content is calculated in terms of a content of the resin composition (P) on the basis of a total amount of the resin components present in the toner.

9. The toner for development of electrostatic images according to claim 1, wherein a content of the resin composition (W) in the toner is not less than 10% by mass and not more than 60% by mass, wherein the content is calculated in terms of a content of the resin composition (W) on the basis of a total amount of the resin components present in the toner.

10. The toner for development of electrostatic images according to claim 1, wherein a total content of the resin composition (P) and the resin composition (W) in the toner is not less than 40% by mass and not more than 90% by mass, wherein the content is calculated in terms of a total content of the resin composition (P) and the resin composition (W) on the basis of a total amount of the resin components present in the toner.

11. The toner for development of electrostatic images according to claim 1, wherein a mass ratio of the content of the resin composition (P) to the content of the resin composition (W) [resin composition (P)/resin composition (W)] in the toner is not less than 0.3 and not more than 3.

12. The toner for development of electrostatic images according to claim 1, wherein a content of the resin (B) in the toner is not less than 10% by mass and not more than 60% by mass, wherein the content is calculated in terms of a content of the resin (B) on the basis of a total amount of the resin components contained in the toner.

13. A process for producing a toner for development of electrostatic images, the process comprising:

1: subjecting an acid group-containing amorphous polyester-based resin (A) and an amine compound to condensation reaction to obtain a resin composition (P); and 2: melt-kneading toner raw materials comprising the resin composition (P) obtained in 1, a colorant, and a resin composition (W), wherein the resin composition (W) is a resin composition formed by subjecting an alcohol component (W-al), a carboxylic acid component (W-ac) and a hydrocarbon wax comprising at least one functional group selected from the group consisting of a hydroxy group and a carboxy group to condensation reaction, and wherein the toner comprises an amorphous polyester-based resin (B) having a softening point that is higher than 120° C. and not higher than 170° C.

14. The process for producing a toner for development of electrostatic images according to claim 13, wherein the amine compound comprises at least one compound selected from the group consisting of a polyalkyleneimine comprising an alkylene group comprising not less than 1 and not more than 5 carbon atoms, a polyallylamine, a (poly) ethylenepolyamine, and a tertiary alkanolamine comprising not less than 2 and not more than 9 carbon atoms.

15. The process for producing a toner for development of electrostatic images according to claim 13, wherein the amine compound comprises the polyalkyleneimine comprising an alkylene group comprising not less than 1 and not more than 5 carbon atoms.

16. The process for producing a toner for development of electrostatic images according to claim 13, wherein the amorphous polyester-based resin (A) is a polycondensate of an alcohol component (A-al) and a carboxylic acid component (A-ac), and the alcohol component (A-al) comprises an alkyleneoxide adduct of bisphenol A.

17. The process for producing a toner for development of electrostatic images according to claim 13, wherein the hydrocarbon wax is the hydrocarbon wax comprising a hydroxy group.

18. The process for producing a toner for development of electrostatic images according to claim 13, wherein a softening point of the amorphous polyester-based resin (A) is not lower than 80° C. and not higher than 120° C.

* * * * *